(12) United States Patent
Jablonski

(10) Patent No.: US 8,142,061 B2
(45) Date of Patent: Mar. 27, 2012

(54) LIGHT GUIDES, ILLUMINATED ARTICLES AND DEVICES

(75) Inventor: Xavier Andrew Jablonski, Moorabbin (AU)

(73) Assignee: All Innovations Pty Ltd, Moorabbin, Victoria (AU)

( * ) Notice: Subject to any disclaimer, the term of this patent is extended or adjusted under 35 U.S.C. 154(b) by 81 days.

(21) Appl. No.: 12/086,229

(22) PCT Filed: Dec. 11, 2006

(86) PCT No.: PCT/AU2006/001870
§ 371 (c)(1),
(2), (4) Date: Sep. 2, 2008

(87) PCT Pub. No.: WO2007/065227
PCT Pub. Date: Jun. 14, 2007

(65) Prior Publication Data
US 2009/0003014 A1    Jan. 1, 2009

Related U.S. Application Data

(60) Provisional application No. 60/748,736, filed on Dec. 9, 2005.

(51) Int. Cl.
*B64D 47/06* (2006.01)
(52) U.S. Cl. .......................... 362/559; 40/541
(58) Field of Classification Search .................. 362/559, 362/581, 576, 554, 560, 555; 40/541, 547, 40/558, 550, 551, 564, 580
See application file for complete search history.

(56) References Cited

U.S. PATENT DOCUMENTS

| | | | | | |
|---|---|---|---|---|---|
| 2,173,371 | A | * | 9/1939 | Penoyer | 40/547 |
| 3,056,221 | A | * | 10/1962 | Brienza | 40/545 |
| 3,497,981 | A | * | 3/1970 | Tyne | 40/547 |
| 5,027,259 | A | | 6/1991 | Chujko | |

(Continued)

FOREIGN PATENT DOCUMENTS

CN     2568958 Y     8/2003

(Continued)

OTHER PUBLICATIONS

Jul. 3, 2010 Office Action issued in Chinese Patent Application No. 200680050583.2 (with partial translation).

*Primary Examiner* — Julie Shallenberger
(74) *Attorney, Agent, or Firm* — Bio Intellectual Property Services LLC (Bio IPS); O. M. (Sam) Zaghmout

(57) ABSTRACT

A side-emissive flexible polymeric light guide 1 is formed with a main body portion 6 and an integral attachment or anchoring element 7 that extends along its length for attaching the light guide 1 to an item. The attachment element 7 may be in the form of a flat strip of material which may be stitched to an item or may be formed for a snap-fit or in any other appropriate form, e.g. a rib and groove profile. The attachment element 7 is preferably opaque and co-extruded with the main body portion. The light guide may provide effective and simple to use trim and piping and may be used with bags, mobile phone pouches, clothing, furniture and signage. Various new mobile phone alert and signage systems are also disclosed which may, but need not, include a light guide having an integral attachment element.

9 Claims, 11 Drawing Sheets

U.S. PATENT DOCUMENTS

| | | | |
|---|---|---|---|
| 5,416,669 A * | 5/1995 | Kato et al. | 362/551 |
| 5,542,017 A | 7/1996 | Koike | |
| 5,791,758 A * | 8/1998 | Horgan et al. | 362/554 |
| 6,186,645 B1 | 2/2001 | Camarota | |
| 6,361,186 B1 * | 3/2002 | Slayden | 362/241 |
| 6,676,284 B1 * | 1/2004 | Willson et al. | 362/555 |
| 6,883,931 B2 * | 4/2005 | Tufte | 362/223 |
| 6,953,262 B2 * | 10/2005 | Cleaver et al. | 362/219 |
| 7,086,769 B1 * | 8/2006 | Thompson et al. | 362/559 |
| 2004/0107616 A1 * | 6/2004 | Ko et al. | 40/550 |
| 2005/0213343 A1 * | 9/2005 | Jablonski | 362/602 |
| 2005/0231947 A1 | 10/2005 | Sloan et al. | |

FOREIGN PATENT DOCUMENTS

| | | |
|---|---|---|
| EP | 1 657 694 A1 | 5/2006 |
| JP | A-07-209519 | 8/1995 |
| WO | WO 2004/012551 A1 | 2/2004 |
| WO | WO 2005/052443 A1 | 6/2005 |

\* cited by examiner

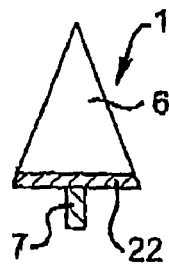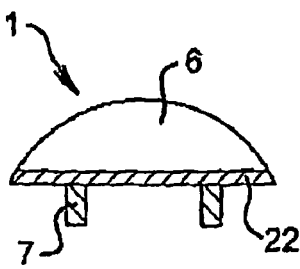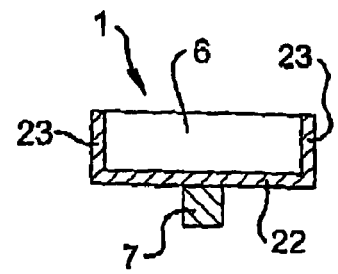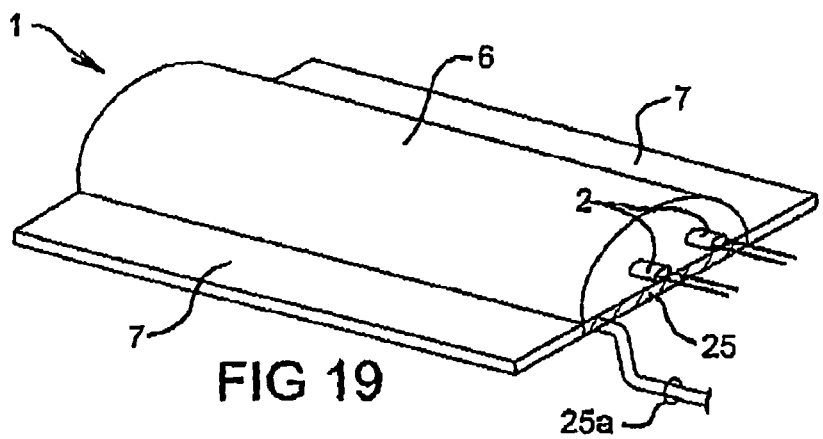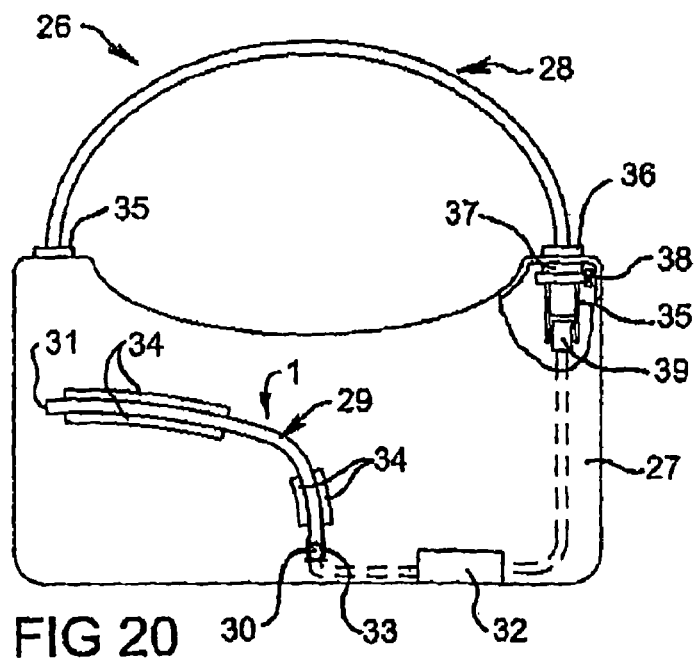

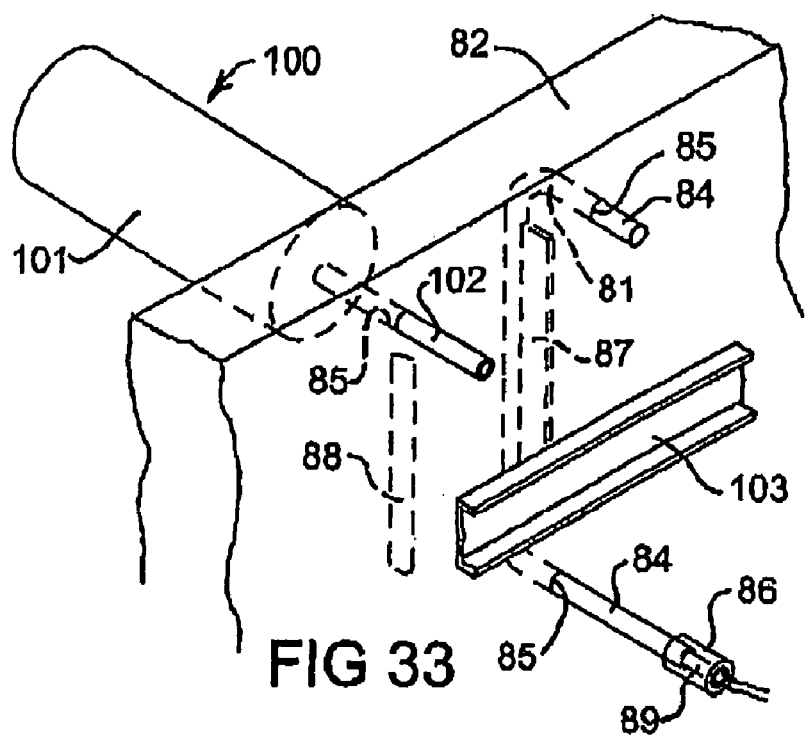
FIG 33
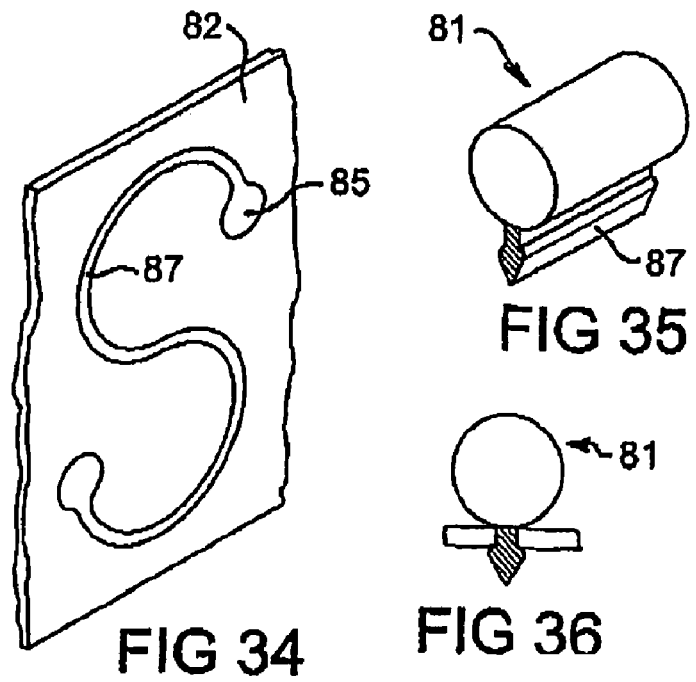
FIG 34
FIG 35
FIG 36

LIGHT GUIDES, ILLUMINATED ARTICLES AND DEVICES

The present application claims priority from U.S. Provisional Patent Application U.S. Ser. No. 60/748,736, the contents of which are incorporated herein in their entirety.

The present invention relates to side-emissive light guides and to illuminated articles and devices that may use such light guides.

A number of innovative illuminated articles and devices are described in International Patent Application No. PCT/AU03/00982 filed on 2 Aug. 2003 and entitled "A Novelty Device", as well as in International Patent Application No. PCT/AU2004/001664 filed on 26 Nov. 2004 and entitled "Illuminated Articles and Devices". The contents of both of these patent applications are incorporated herein in their entirety by reference.

The devices in these applications include light guides that emit light along their lengths, so as to provide e.g. an illuminated necklace, bracelet, or the like, or a signal wire, e.g. a lead for a loudspeaker, headphones, musical instrument or the like.

These devices all provide for pleasing effects that for example may allow for illumination of the devices based upon a preset program or in response to detected sounds.

One aim of the present invention is to add to the stock of illuminated articles and devices, and to provide new and advantageous side-emissive light guides, and new and advantageous articles and devices that may incorporate side-emissive light guides.

In one aspect, the present invention provides a side-emissive light guide, the light guide having a main body portion formed from a flexible elongate length of side-emissive polymeric material, and an integrally formed attachment element extending along the length of the main body portion, the attachment element being configured to allow the light guide to be attached to another item.

The attachment element may be configured for any suitable type of fastening, e.g. adhesive fixing, welding, e.g. sonic welding, stapling, riveting, or sewing. It may also take any suitable shape, and for example may be formed as a flange element, e.g. in the form of a flat elongate strip of material or in a T-shaped cross-sectional profile. The attachment element may also have a profile that interlocks or fits with a complementary profile on an associated attachment part of an article or device on which it is to be mounted. It may for example be formed with ridges/ribs and/or channels/grooves, which interlock with corresponding ridges/ribs and channels/grooves on a device or article to which the light guide attaches. The attachment element may be formed to provide a snap-fit connection, and may for example be formed as a rib connected to the main body portion of the light guide by a neck portion.

It has been found that short lengths of various polymeric materials are able to exhibit bright and visually-appealing side-emissive effects. By providing a light guide that has a main body portion formed from such side-emissive polymeric materials, that is flexible, and that also has an integral attachment element extending along the length of this body portion, the applicant has been able to provide cost-effective, robust and versatile trim, piping and the like for many different forms of item.

For example, an attachment element in the form of a flat elongate strip may be used to simply and securely attach a length of polymeric light guide to clothing or the like, e.g. through stitching of the attachment strip onto or between pieces of fabric. The light guides may also be used on articles such as bags, shoes and the like, and may be used on electrical and electronic goods, e.g. mobile telephones, computing devices, sound devices and the like. The light guide may also be used in many other situations, e.g. as vehicle trim, on furniture and on building structures.

The light guides may advantageously be formed of polyurethane, polyester, polyvinylchloride and blends thereof, and may simply be formed from a solid or tubular length of unclad polymeric material. When formed as a tubular element, the light source is preferably coupled into the annular end wall of the element, so that the light is injected into the solid wall material rather than into the empty core of the material.

The light guide may be formed in an injection moulding process or in an extrusion process. For example, the main light-guide body portion and a flat flange strip attachment element may be extruded together as a single integral element through a keyhole-shaped extrusion die.

The attachment element is advantageous over for example separate clips or clasps that might be used to attach a light guide to a device, as the latter may be unsightly, and also would only provide attachment at specific points. In contrast, the present attachment element may fasten the light guide along its length and may be essentially invisible in a finished product. It should be noted, however, that although advantageous, the attachment element need not be continuous along the light guide, and could be formed as a series of elongate attachment portions. Also, a continuous attachment element may advantageously be configured such that it can be trimmed from the main body portion, so that the positions and lengths of the remaining attachment element portions can be tailored to any specific attachment situation. For example, a portion of a guide's attachment element may be removed at a point where it is formed into a curve, so as to facilitate the bending of the guide.

In one preferred embodiment, the attachment element is formed from different material to that of the main light guide portion of the guide. This may be achieved by forming the light guide body with the flange in a co-extrusion process or in a suitable moulding system, e.g. injection moulding. This may for example allow the attachment element to be formed for good fixation qualities, whilst the main body is formed for good optical and side-emissive qualities.

In one preferred embodiment, the attachment element is formed of or covered by light-blocking material that substantially blocks light transmission material, e.g. the attachment element may be formed of opaque or reflective material. This prevents light from leaking from the light guide via the attachment element. This can be especially useful in situations when an attachment element has sharp edges or corners, e.g. when in the form of a flat elongate flange, and also helps to prevent light spill from fastening holes, e.g. when a flange element is stitched into position.

In an alternative embodiment, light blocking material, e.g. opaque or reflective material, may be provided only in the transition zone between the light guide body and the attachment element. For example, the light guide body, attachment element and light blocking transition portion may be formed together in a three-part co-extrusion.

The main body of a light-guide may include masking material, e.g. opaque or reflective material, along its length which prevents and/or reduces the transmission of light a portion of the light guide surface. The masking material may be applied in any suitable manner, e.g. by a coating or layering process, and in one preferred form is extruded with the light guide material. The masking material may reflect light back into the guide so that it may be emitted elsewhere. The masking material may allow light to be emitted only at certain portions along the length of a light guide or only from particular surfaces or surface regions of the guide. Reflective materials may include white polymers, metallic coatings, reflective taping and the like.

The use of masking material may for example block or reduce light leakage from flat surfaces and/or sharp edge regions of the main body of a guide, and/or may allow light to be emitted only along one side of the guide.

In one example, the main body of the light guide may be masked along its length in the region of the attachment element, e.g. in a region extending out from each side of a flange element, so that when the guide is mounted on a surface, the masked regions will face the surface and will ensure that light is channelled out of visible portions of the guide that face away from the mounting surface. In another example, a light guide may be provided between two parts of a product, e.g. between two pieces of fabric material through a pair of opposing attachment elements, e.g. flanges, and the guide may be masked along its length in the region between the attachment elements on one side of the guide. The guide then only provides illumination from one side of the resulting composite element.

The attachment elements may themselves provide masking elements, and/or the masking elements may be co-extruded with the light guide and with the attachment elements.

The masking material and/or the attachment element may be coloured. They may be of a different colour to the light input into the guide, so as to provide a light guide that changes colour. For example, when unilluminated, the guide may take the colour of an attachment or masking element due to reflection of natural light from the element's surface through the light guide, which may be enhanced by a lensing action of the main body portion. When illuminated, however, the colour of the input light may dominate and/or combine with the colour of the attachment or masking element, so that for example a light guide with red masking material and a blue light source may change from red, when unlit, to purple, when lit. The masking and attachment elements may also be colour-matched to the input light to highlight the colour of the input light, and to reduce the visibility of the attachment and/or masking elements when the light guide is lit.

The attachment element may have preformed holes therein for receiving a fastening element or thread. The attachment element may be solid and configured for penetration by a sewing needle, rivet, staple or the like.

The light guide may be provided with more than one attachment element, e.g. flange, and, for example, the light guide may be provided with a pair of opposing flanges or connection profiles, e.g. ridges or channels.

The light guide may be of any suitable profile, and one advantage of being able to form the light guides by a simple extrusion or injection moulding process is that they can be formed into a number of different cross-sectional profiles without difficulty e.g. through the provision of suitable extrusion dies. The attachment element may allow the main body of the light guide to retain a cylindrical or other preferred form, e.g. for optimum optical functionality, whilst the attachment element may be configured to suit the fastening application.

In one preferred embodiment, the light guide has a curved cross-sectional profile, e.g. is circular. This can provide a light guide that emits light uniformly and efficiently over the distances generally required for trim applications and the like. As well as being circular, the light guides may have an oval or elliptical cross-section, and these may provide good light transmission and emission qualities, whilst having a lower profile.

Curved surfaces can allow for light to be reflected out of the light guide at various different angles, and can help to provide a particularly effective output. Corners and/or edges of the main body of the light guide may be rounded in form.

As well as the use of curved emission surfaces for the guide, a curved masked surface, e.g. a parabolic surface, may also assist in providing a brighter light guide by reflecting light in a number of directions also, this light may then exit a flat or curved emission surface at various angles.

As said, the present light guides may be used in many different applications, and, for example may be used to trim bags, e.g. handbags, purses and the like. They may for example be stitched into a side wall of a bag or into the bag handles, and may be lit by LEDs. The bag trim is safe, cool, robust, and able to withstand day to day wear and tear. A LED may be mounted at one or both ends of the light guide, and may be powered by a battery housed in a separate portion of the bag, e.g. in a pouch on a sidewall of the bag, in the lining of the bag, or in the bottom of the bag. A controller may also be provided in the bag, e.g. with the battery or in a separate location, to control the lighting of the LEDs in any desired manner.

In another application, the side-emissive light guides may be mounted on footwear, e.g. shoes, e.g. in the shoe uppers and/or sole or between the two. The guides may for example be mounted in grooves in the sole, e.g. in a snap fit manner, or may be moulded into the sole. A controller may be mounted in the shoe, e.g. in a sole of the shoe, and any number of light guides may be used to provide a desired pattern of light. The controller may include a pressure sensor, and may activate the LEDs in accordance with the pressure sensor, e.g. so that the light guides are illuminated based on pressure associated with a person's step.

In a further application the side-emissive light guides may be mounted on clothing or other such items. For clothing and for other items that require washing or the like, the light guides may be provided with lighting units and/or controller and power source units that are detachable from the guides and from the articles. This then allows the articles and light guides to be washed, whilst sensitive electronics, batteries and the like may be kept safe. The lighting units may be configured to remain attached to the light guides, e.g. when they use LEDs, and may be robust enough and suitably sealed so that they too may be washed. Also, the articles may include washable wiring, and a removable controller and power source may connect with connectors of the washable wiring that in turn connects with the lighting unit or units of a light guide or light guides. For example, the controller may connect to the wiring via jack plugs or the like.

The use of an integral light body and flange for the light guide is especially useful in these situations, as the light guide and flange can be made waterproof and robust, and can be releasably coupled with a lighting unit or the like in a simple manner, e.g. through a friction or clip fit and e.g. through a butt-coupling and through an elastic sleeve holder.

In another useful application, the light guides may be used on safety items, e.g. safety wear, e.g. clothing, vests, arm bands, shoulder harnesses and bands, reflective strips, helmets and the like, to illuminate the wearer and highlight their presence. This may be particularly useful to cyclists, motor-cyclists and to emergency services personnel, as the guide may be integrated into their sports or protective clothing. The light guides may also be applied to road markings and signage devices, e.g. road cones, and to marker elements in general.

In one preferred embodiment, one or more light guides are provided on a life preserver, e.g. personal flotation device, life jacket, vest, ring, belt or survival suit. In this embodiment, the light guides and controllers and power sources will be suitably sealed and waterproofed, and the use of a light guide with an integral attachment element is particularly useful in this situation, as the integral light guide and attachment can be made to have high waterproofing integrity.

The light guide may be part of an assembly that includes a sensor for sensing an emergency or danger condition, and may for example sense water, e.g. fresh or salt water, so as to light the light guides automatically on contacting water. For example, the sensor may be formed by an element that dissolves in water to release a trigger element and form an electrical connection. The light guide may also be activated by the inflation of an associated life vest or jacket, e.g. through a switch associated with a gas inflation device.

The light guides may also be activated via an on/off switch or other non-emergency circuit, e.g. a photoelectric sensor for sensing ambient light conditions. The light guides may then be lit up constantly at night or in poor visibility to allow good visibility of individuals or safety articles, e.g. persons moving/working on a boat at night or the location of a life ring. In this case, the safety device may include two power supplies, one for non-emergency lighting, e.g. manual or constant illumination, and one for use in emergency situations, e.g. on falling in the water. This ensures that the light guide will have sufficient power for the safety situation, and the emergency circuitry battery may be replaced yearly or the like. Such a system may be especially useful for commercial and recreational fishermen, sailors and yachts people.

In another application, the side-emissive light guide may be mounted onto a mobile telephone or onto a holder for a mobile telephone, e.g. a bag, cradle, lanyard or the like. In this embodiment, a light guide controller may include a sensor for detecting when a call is received, and may illuminate, e.g. flash, the light guide accordingly. The sensor may sense electromagnetic waves associated with reception or transmission of data by the telephone, and may be formed of an RF coil. In an alternative embodiment, the sensor is a vibration sensor, e.g. a piezoelectric sensor, and the sensor senses vibration of a mobile phone. The light guide may also be integrated into a mobile phone itself, and the lighting may then be controlled by the software of the telephone itself.

Although such call alert systems may be advantageously used with the light guide trim discussed above, they could also be used with other illumination elements, e.g. other light guides or LEDs, and could provide other alert signals, e.g. a sound signal or a wireless signal to a remote alert device, e.g. a light guide wristband. Accordingly, viewed from another aspect, the present invention can be seen to extend to an item for use with a mobile phone, the item including a mobile phone call alert system, the system including a call sensor for monitoring for a call to a mobile phone associated with the item, and a controller for monitoring the call sensor and for alerting a user to a call on said phone.

The item may take any suitable form, and for example may be a holder for the phone. It may be for example a cradle for the phone, e.g. for vehicle or desk mounting, a lanyard to hold a phone around a user's neck, a dedicated mobile phone case, a purse, a handbag, or a general holdall or the like.

The use of a piezoelectric sensor is a particularly advantageous feature, as it allows most types of phone to be sensed, whereas an RF sensor is generally only practicable for GSM phones. When using a piezoelectric sensor, the controller may determine whether the signal from the sensor is indicative of a mobile phone ring. For example, the controller may check for a specific frequency in the detected signal corresponding to a characteristic mobile phone ring frequency. It may also check other characteristics, e.g. amplitudes, repeat rates and the like, and may compare the sensed signal to a reference signal. The controller may also be placed in a training mode, in which it may monitor the sensor output whilst a user vibrates their phone, and records characteristics of the phone ring to later identify incoming calls through a comparison of the recorded characteristics with the sensor signals.

The system may also include a filter element, separate from a microprocessor controller, that monitors the sensor signal and that outputs a signal when the sensor signal is indicative of a mobile phone ring. This may then save power, as the controller may be set to a sleep state, and the output of the filter may be used to wake the controller up. The controller may then initiate any required actions, e.g. to illuminate a light unit. On waking, the controller may also monitor the sensor output to check that a call is being received. Thus, the filter may provide a rough determination of a call, and the controller may verify a call signal on waking up. The filter may be hardwired into the system.

In further applications, the light guides may be used to provide illumination of a surface, or a surrounding area, and may be mounted appropriately to a surface or device requiring illumination, e.g. around its edges, or to a holder to allow the light guide to illuminate an area.

In another preferred application, the light guides may be shaped into graphical forms so as to provide signage, and the attachment elements may be used as anchoring elements for anchoring the light guides in place in a mounting board. The light guides may for example be used in a similar manner to neon tubes or cool fluorescent tubes or the like.

Accordingly, viewed from another aspect, the present invention provides a sign including one or more flexible side-emissive light guides, each said light guide having an integral anchoring element formed along its length, a board for mounting said light guides, and one or more lighting elements for lighting said guide or guides.

Due to their flexibility, the light guides can be formed into a variety of curvilinear graphical forms, and, as they have attachment/anchoring elements running along their lengths, they are able to be held firmly and accurately in place without losing their form. Furthermore, mounting may be achieved quickly and simply, and in an inconspicuous manner.

The anchoring elements may be formed as an elongate flat strip of material that in use extends into a slot or slit in the mounting board. The board may be formed of resilient material in which slits may be cut, and in this case, the resilient material may clamp the anchoring elements in place. Once in place, a rigid support member, e.g. a metal or plastics batten or battens, may be placed on the back of the mounting board to reinforce the board, to flatten it and to urge the slits closed so as to provide a positive clamping action on the anchoring element. In an alternative embodiment, the board may be a rigid board. In this case, the light guides may snap-fit into slots in the board. The slots may be pre-cut, e.g. by laser cutting or the like. In both cases, the boards may have holes therein through which the ends of the light guides may pass. These ends may then be coupled to lighting units for their illumination or to end caps that may block the light and/or reflect light back down into the light guide. The rigid form of signage may be mainly applicable to commercial signmakers, whilst the resilient board may be preferred for do-it-yourself signmaking.

The light guides may be configured so that they may be cut to length, and the anchoring elements may be configured so that they may be trimmed as needed, e.g. at their ends and at bends along their lengths. Removing the anchoring elements at the light guide ends allows the ends to pass through mounting holes in the board and also to engage with sleeves or the like of the light units, whilst removal of the anchoring element portions along the light guide length may allow it to be bent more easily.

As discussed previously, the anchoring elements may be formed of or covered in opaque or reflective material so that light does not leak from them out of the main light guide portions.

The lighting units, e.g. LED units, may be driven by a suitable control unit. The control unit may have various control regimes to chose from and various ports that operate in accordance with one or more of these regimes. This allows the light units to be plugged into appropriate ones of the ports and for the control regime to be appropriately set so as to enable a user to run the light guides under a number of different regimes, e.g. the light guides may be run to flash, and/or to light in various sequences and colours.

A sign may be provided in kit form, and, viewed from another aspect, the present invention provides a sign-making kit including a length of side-emissive light guide that can be cut into a number of light guide portions, said length of side-emissive light guide having an integral anchoring element extending along its length, a mounting board in which may be cut or are pre-cut mounting slits or slots for receiving anchoring elements of cut light guide portions and exit holes for receiving ends of said cut light guide portions, and a set of light sources for coupling with ends of said cut light guide portions.

The kit may also include other items, including for example a controller, blackout material and the like. The controller may for example be mains or battery powered. The controller may include a number of possible light regimes that a user may choose from. It may include flash memory that may allow it to receive new lighting programs and the like, e.g. downloaded from a computer, e.g. PC, or the like, e.g. via a suitable connection, such as a USB socket. Alternatively, a computer may run the signage remotely, e.g. from a central site.

The invention also extends to a method of making an illuminated sign including the steps of:

cutting a length of side-emissive light guide into a number of light guide portions in accordance with a desired design, said length of light guide having an integral anchoring element extending along its length;

cutting slits or slots and exit holes in a mounting board in accordance with said desired design;

mounting said cut light guide portions onto said board, with anchoring elements of said cut light guide portions held in said slits or slots and with the ends of said cut light guide portions extending through said exit holes; and coupling at least one light source to at least one end of each mounted light guide portion.

As well as forming signage by bending lengths of light guide into desired graphical forms, a single elongate portion of side-emissive polymeric material may be formed to have a light-emitting front face, and may have graphics provided on the front face, e.g. printed on the front face.

Thus, the present invention may extend to a signage element including an elongate body portion formed from side-emissive polymeric material, and a light source for lighting said material, wherein light from said light source is emitted from a front face of said body portion and wherein graphics are provided on said front face of said body portion.

The polymeric material may still be extruded or injection moulded, and may have elongate attachment elements and masking elements as discussed above with respect to other light guides. The attachment elements may for example allow the signage element to be fastened onto or into a wall or the like, and again may be opaque, reflective and/or coloured.

The polymeric material may have curved profiles and masking materials, e.g. reflective material, can help to ensure that light is not inappropriately lost and e.g. that it is directed out of the front face of the block. The corners of the block may be curved, and/or a rear face and side edges of a block may be coated with reflecting material. The material could have a curved rear surface for reflecting light out of the front face, and could also have a curved front surface. These surface may allow light to exit the front face at a number of angles, and so give the device a brighter appearance.

Preferably, the polymeric material has a flat front face and preferably also a semi-cylindrical rear that includes a reflective backing. It also preferably has flange attachment elements running along its top and bottom sides, so that it may be fastened to a wall element above and below a recess made in the wall for the signage material. Also or alternatively, the polymeric material may have an integral attachment element along its vertical sides, e.g. along its ends.

Again, these signage blocks can have relatively short lengths, the light can remain sufficiently uniform and bright across the signage surface for a number of purposes, even when lit by only a relatively few LEDs. Larger number of LEDs may however also be used in signage, so as to provide extra brightness, and may be provided at one or more sides of the material, e.g. at one or both ends of the body of material. Other light sources, such as incandescent light, halogen bulbs or the like may also be used. In one preferred embodiment, an electroluminescent element or elements are provided along the length of the polymeric material.

Signage graphics and masking may be formed by printing onto the front surface of material, e.g. by inkjet printing, Tampo or pad printing, screen printing or any other suitable method, e.g. stencils. The graphics may be solid to mask or block light. The graphical elements may also be translucent whereupon they may change colour when illuminated from the colour of the printing material to a combination of the colours of the printing material and the input light. This allows for a particularly attractive form of signage, in which the colour of the graphics can mix with the colour of the illuminating light input into the light guide. For example, a block with blue graphics and red illumination will allow the block graphics to be blue when unilluminated and will turn the graphics purple with a red background when illuminated. The light source may be configured to input different colours to provide further interest, and may allow the graphics and background to change colours accordingly.

Instead of printing directly onto the polymeric material, the block could be provided with graphical elements by sliding a sleeve over it, the sleeve having the appropriate graphics, masking or the like thereon. In this case, the sleeves could be produced in many different designs and bought to mix and match with different basic light guide and controller combinations.

In one embodiment, the signage face may be masked with removable masking elements that define graphics, so that the signage face may be coated or painted over and the masking elements then removed to reveal lit graphics. The masking elements may for example be removable adhesive masking elements, and may be formed of wax paper or the like.

In one embodiment, the signage may be recessed into a wall with the masking material thereon, the wall is then painted, and the masking material removed. This then leaves lit graphics that appear in the body of the wall.

Thus, viewed from a further aspect, the present invention extends to a method of providing signage, the method including the steps of mounting a signage element as above on a wall, painting over the wall and front face of the signage element, and removing the masking material.

The above light guides in all their forms may be illuminated by any suitable light source. A single LED or an array of LEDs may for example be used as a light source, and may be coupled to one or both ends of a length of light guide and/or to one or more sides of a side-emissive signage block. A light guide may have a reflecting surface on the end distal to a LED input end to reflect light back along the guide. The light guides may also or alternatively be illuminated by electroluminescent material, and a light guide may for example have electroluminescent (EL) material provided along its length. This EL material could be combined with and/or take the place of masking elements. For example, a light guide may have a rear face on which is mounted electroluminescent material, a front face through which light escapes and side faces between the front and rear faces that are reflective and that channel light to the front face. Electroluminescent material may also be used to light signage blocks formed form side-emissive polymeric materials, and may be combined with LEDs, e.g. so that LEDs are provided at the ends of the afore-mentioned light guide. This may increase brightness and/or provide different colour light mix possibilities.

Other light sources could include incandescent lighting units, as well as halogen lights and the like, especially in the context of signage.

The light guide light sources may be controlled in any suitable manner. They may provide simple constant illumination and glow with a steady light. Alternatively, guide assemblies may include a controller to provide a flash output, and/or to change the colour, intensity, flash frequency, duration or the like of the light. The light may be controlled in accordance with one or more preset programs or in accordance with sensed parameters, e.g. sound, light, temperature, pressure, electromagnetic radiation or the like. For example, an IC controller may be provided with the light guide to control the light sources. Controls may be used for example such as discussed in WO 2004/012551 and WO 2005/052443.

To further enhance the lighting effects and to provide more colour outcomes, the light guides and signage may be provided with reflective backings and masks that are coloured to mix in a desired manner with the light input into the guide.

The light guide lighting units and controllers may receive power by battery, mains power or other means, e.g. solar cells or the like.

Preferably, the light guides are less than about 2 m in length, although longer light guides are also possible. The present invention may be applied to guides under about 1.5 m or under about 1 m, and in light guides under about 50 cm or under about 30 cm. The light guides may have diameters in the range of about 2 mm to about 20 mm, and may be as large as 40 or 50 mm, e.g. when used in signage embedded in walls.

For shorter lengths of guide, the light from an LED or the like may be thought of as being "dumped" across the guide, so as to provide a relatively intense light, whilst, for the same light input, longer lengths of guide may be thought of as "stretching the light source" to provide a lower intensity (although still usefully bright) light that is efficiently distributed along the guide's length.

The light guides may be of thermoplastic polyurethane elastomer. The polyurethane material may be based on any suitable isocyanate, e.g. diisocyanate, and polyol combination. The polyols may include for example polyester, polycapralactone or polycarbonate. It has been found that a particularly good side-emissive light guide can be formed using polyurethane materials that are based on polyether polyols. Polyether polyurethanes have been found to provide particularly effective side-emissive light guides in terms of both the intensity of the light emitted and the lengths over which the light may be emitted. The polyurethane may be sourced from food grade or medical grade polyurethane, especially where it is for wear on the body.

The polymeric material may include suitable additives so as to provide various properties to the light guide, e.g. desired characteristics for a particular application. Additives may for example be used to control colour, clarity, elasticity, flexibility, rigidity, durability, UV protection and the like.

In one embodiment, the light guide is tinted to have a desired colour (whilst still retaining good light transmission characteristics). Colour tinting may be achieved for example by adding a suitable pigment or the like to the light guide material. The adding of the pigment may be used to assist in the transmission of wavelengths of light of similar colour, and/or to hinder light transmission at other wavelengths. It may also allow for a range of colour combinations to be produced from a mix of different light guide colours and input light colours.

The light guide may be covered by one or more outer layers of material, e.g. to provide protection or the like or to assist in light transmission. For example, the light guide may include a core of polyurethane and an outer cladding of lower refractive index to aid in the side-emission qualities of the material. The light guide may for example be covered in a transparent layer of Teflon® or any other suitable cladding. It has been found however that an unclad polyurethane light guide is very effective in the variously discussed applications above.

As well as polyurethane, other possible materials include polyvinylchloride, polyester, and blend thereof. The material could also take other forms, including for example those disclosed in U.S. Pat. No. 5,542,017, e.g. in Tables 1 to 3, the contents of which document are enclosed herewith in their entirety. The light guides could also take still other forms including a polymeric matrix that has light scattering particles embedded in it along its length. The light guides may also be made of a polymer cladding with a liquid core, e.g. an aqueous salt solution, such as saline or of distilled water.

It should be noted that any of the features mentioned above may be combined with any other features mentioned above or in the following description, as appropriate.

Various types of light guide and articles and devices associated with the present inventive concepts will now be described, by way of example only, with reference to the accompanying drawings. It is to be understood that the particularity of the drawings does not supersede the generality of the preceding description of the inventive concepts.

In the Drawings:

FIGS. 15 to 18 are cross-sectional views of light guides having light transmission body portions of various different shapes;

FIG. 19 is a perspective view of a light guide having a semi-cylindrical shape and a pair of opposed flange elements, together with a light source that includes an electroluminescent strip;

FIG. 20 is a view of a handbag with a light guide handle and trim;

FIG. 33 is a rear perspective view of signage elements that may be used to provide the sign of FIG. 30;

FIGS. 34 to 36 show further signage elements that may be used to provide the sign of FIG. 30.

Figure 1:
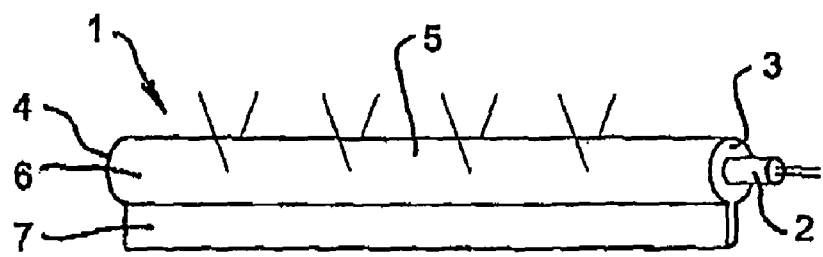
FIG. 1 shows a side-emissive light guide having an integral attachment element.

Referring to FIG. 1, a light guide 1 is shown that receives light from an LED 2 coupled to a first proximal end 3 of the guide 1. Rather than being configured to channel as much of the light as possible to the distal end 4 of the guide 1, as would be the aim of a typical optical fiber, the light guide 1 is configured to be side-emissive, i.e. to emit light from its sidewall 5 along its length.

The light guide 1 includes a main body portion 6 and an integral attachment element 7 formed along its length, e.g. in the form of a flange, e.g. a flat elongate strip of material. The flange 7 may be continuous as shown, or may be discontinuous and have spacings along its length. The flange 7 is used to fasten the light guide 1 to another item, such as to an article of clothing or to a device, such as an electronic device. Attachment may be by any suitable manner, e.g. adhesive, welding, stapling, riveting or sewing. The light guide 1 may therefore form an illuminated trim, e.g. for decorative purposes or to highlight the item to which it is attached. It may also be used to illuminate a surface, object or a surrounding area.

The light guide 1 may be formed in any suitable manner, and may be formed by an extrusion process or by injection moulding. The light guide may for example be extruded through a keyhole-shaped die. The ability to simply extrude the light guide main body 6, or injection mould it, means that the flange 7 can be simply formed at the same time to provide an integral assembly.

The light guide 1 may be formed from a solid length of a flexible polymeric material. It may for example be formed from polyurethane, polyvinylchloride and/or polyester materials and blends thereof, and may be formed from thermoplastic polyurethane.

The light guide 1 could also be made from other material. It could for example be made from materials as discussed in WO 2004/012551 and WO 2005/052443. It may for example take the form of a polymer matrix in which are embedded light scattering beads, or may include layers of material of differing refractive index or ridged interfaces. It may include materials as discussed in for example U.S. Pat. No. 5,542, 017.

Figure 2:
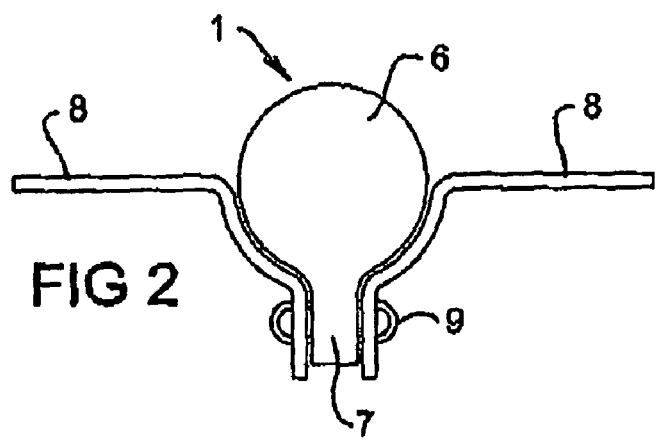
FIG. 2 is a cross-sectional view of the light guide of FIG. 1 mounted between two pieces of fabric.

As shown in FIG. 2, the light guide 1 can be affixed by the flange 7 between two pieces of fabric 8, e.g. through stitching, stapling or the like 9, so that the main body portion 6 can irradiate light and provide a pleasing trim or piping decoration for the fabric.

The main body portion 6 and attachment element 7 may be formed from the same or different materials, e.g. in a co-extrusion process. The attachment element 7 may for example be formed to provide favorable fastening properties, whilst the main body portion may be formed to provide favorable optical properties. Also, the main body portion may be shaped for favorable optical properties, whilst the attachment element may be shaped for appropriate fastening profiles.

Figure 3:
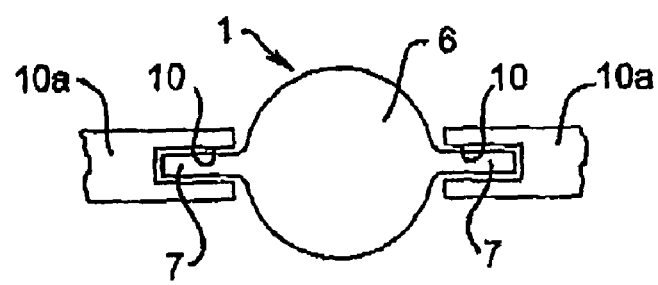
FIG. 3 is a cross-sectional view of a further light guide mounted between two parts of a device.

FIG. 3 shows another light guide 1 that has a main light guide body 6 and a pair of attachment flanges 7 that are diametrically opposed to one another. In this embodiment, the flanges 7 are used to mount the light guide 1 between a pair of channels 10 in for example parts of a moulded article 10a. The flanges 7 may for example be cemented or welded, e.g. sonic welded, in place. This light guide form provides trim that glows from both sides of an article.

Figure 4:
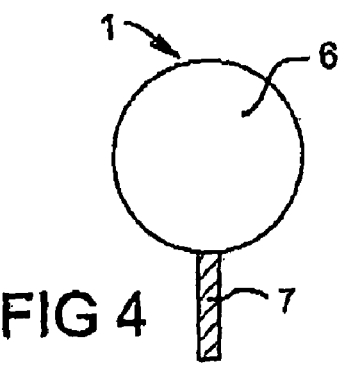
FIG. 4 is a cross-sectional view of a further light guide having an opaque flange element.

FIG. 4 shows an extruded light guide 1 having a main body 6 and flange 7, which is similar to the light guide of FIG. 1, but has a flange 7 formed of opaque material. The use of an opaque attachment element helps to prevent light from escaping from the light guide 1 in an undesired manner. Thus, the use of opaque material stops light from entering the flange 7 and from leaking from the sides and edges of the flange 7 or from holes in the flange 7, e.g. caused during the fastening process. It therefore allows the main body 6 to remain bright.

The use of the opaque flange 7 can be particularly useful when sewing the flange 7 into place, as the numerous piercing of the flange 7 by the sewing needle could otherwise cause significant loss of light and could also provide an unsightly appearance, as bright points of light formed by light spills at the needle holes may be visible due to the lensing effect of the main body portion 6.

The flange 7 may be formed by co-extruding the main body 6 with the flange 7, with the main body material being transparent and with the flange material being opaque. This may be achieved by forming the parts from different types of material, or by having both parts formed from the same type of material, e.g. polyurethane, but with the flange material tinted or the like.

The colour of the flange 7 and the light source wavelength may be matched, at least approximately. This can improve the appearance of the light guide 1, as it has been found that the edge of the flange 7 may be seen through the light guide body 6, and this may in some cases be magnified through the lensing action of the main body portion 6. By matching the flange colour and the light of the LED 2 or the like, the flange edge is not as noticeable when the light guide 1 is lit. Alternatively, the flange element may be coloured differently from the colour of the input light, so that for example when not lit, the light guide may take the colour of the flange element through reflection of natural light off of the flange element and out through the light guide.

Figure 5:
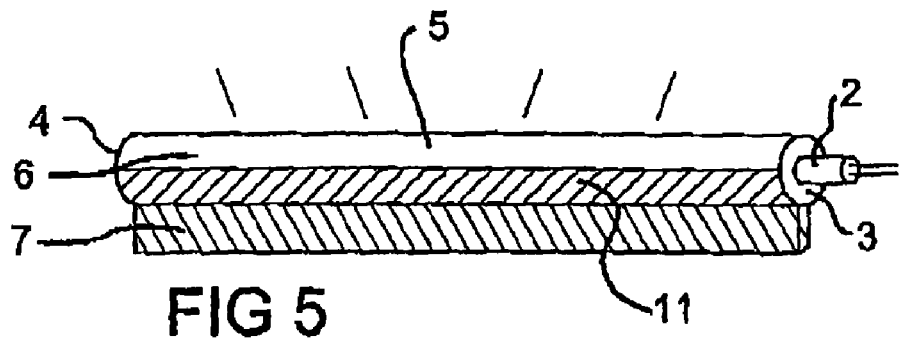
FIG. 5 is a perspective view of a further light guide having an opaque flange element and masking.
Figure 6:
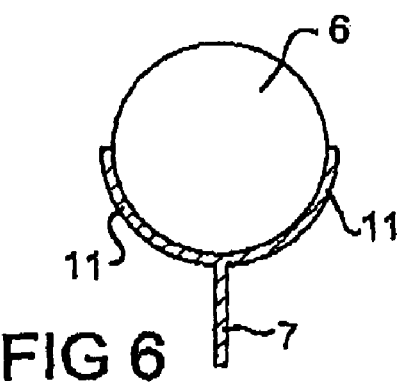
FIG. 6 is a cross-sectional view of a light guide having an opaque flange and masking material to either side of the flange.

FIGS. 5 and 6 show a light guide 1 similar to that of FIG. 1, but including masking material 11 that masks the underside of the light guide 1, so that light is preferentially output from the unmasked top surface. This can provide a brighter appearance to the light guide 1 when viewed from the unmasked top surface.

The masking material 11 may be an opaque and/or reflective material. It may be formed as a coating or from a separate layer of material, and could also be co-extruded with the main light guide body 6 and the flange 7. It could for example be formed from polyurethane material that is formulated to be reflective or opaque. It could also be e.g. a metallic coating, reflective tape or the like.

As with opaque attachment elements 7, the masking material 11 may be coloured to match the input light from the LEDs 2 to the light guide 1 so as to enhance the colour. Alternatively, the masking material 11 may be of a different colour. This can allow the light guide 1 to have a first colour (corresponding to the colour of the masking material 11) when the guide is not lit. The light guide 1 may then change to a second colour when the light guide 1 is lit (corresponding to a combination of the input light colour and the masking element colour).

Figure 7:
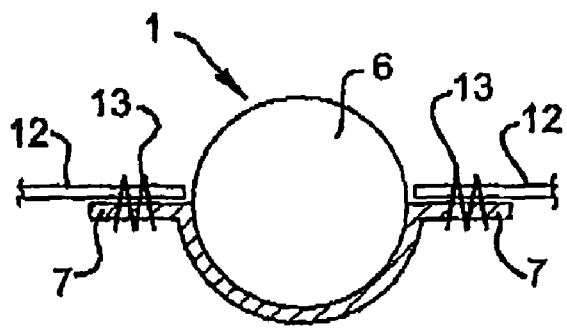
FIG. 7 is a cross-sectional view of a light guide having an opaque flange and masking element.

FIG. 7 shows another light guide 1 having opposing flanges 7 along its length that are attached to fabric 12 by stitching 13. In this case, the light guide 1 is formed from a main light guide body 6 and a flange element 14 that also provides a masking and reflective function. Thus, the light guide 1 will emit light only from the top surface portion of the body 6.

The whole flange element 14 may be co-extruded with the main body 6. In a variation, the flanges 7 may be integrally moulded with the main body 6, and the reflective portion between the flanges 7 may be a reflective coating or the like.

Figure 8:
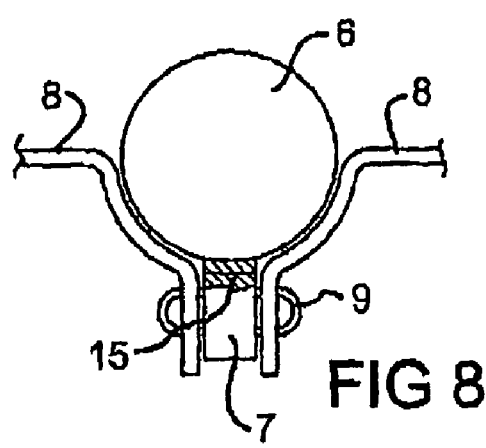
FIG. 8 is a cross-sectional view of a light guide having an opaque portion between a main body of the light guide and a flange portion of the light guide.

FIG. 8 is a similar view to that of FIG. 2, with the flange 7 fastening the light guide 1 to fabric 8 using fasteners 9. In this example, however, the flange element 7 is mainly transparent, and has an opaque or reflective portion 15 provided between the main body 6 and the flange 7. The light guide 1 may for example be fabricated by a co-extrusion of three materials to provide the main body 6, the reflective or opaque blocking portion 15, and the flange 7.

Figure 9:
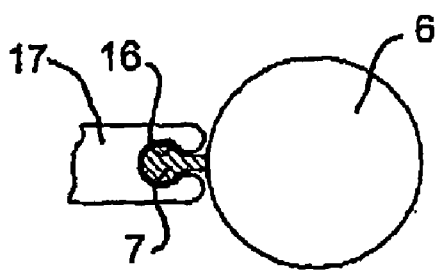
FIG. 9 is a cross-sectional view of a light guide having a snap-fit attachment element.

The attachment element may take other forms also besides a flat elongate flange 7. For example, as shown in FIG. 9, the attachment element 7 may take the form of a snap-fit element that snap-fits into a channel 16 in an item 17. The snap-fit element may for example have the form of an elongate rib attached to the main body by a narrower neck portion.

Other forms of attachment element are shown in cross-section in FIGS. 10 to 14, where the attachment element 7 is configured in various profiles to engage with corresponding profiles of parts 18 of an article or device to which the light guide 1 is to be attached.

Figure 10:
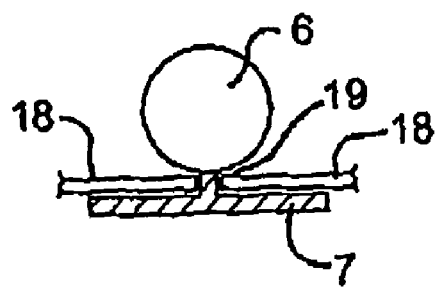
FIGS. 10 to 14 are cross-sectional views of light guides with attachment elements of various further forms.
Figure 11:
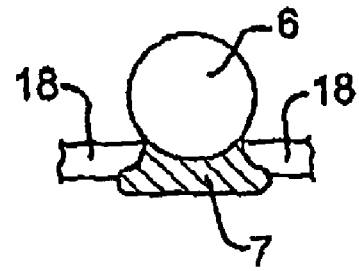

As shown in FIG. 10, the attachment element 7 could be T-shaped, and could slide into a slot 19 between two parts 18 of an article. The cross-bar portion of the flange 7 could then be adhered or welded along the periphery of the slot 19. In FIG. 10, the attachment element 7 may be push-fit into a slot 19 of the part 18, and may then be flattened, e.g. by heat and pressure to fix itself in place.

Figure 12:
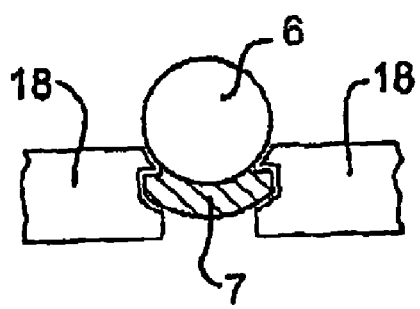
Figure 13:
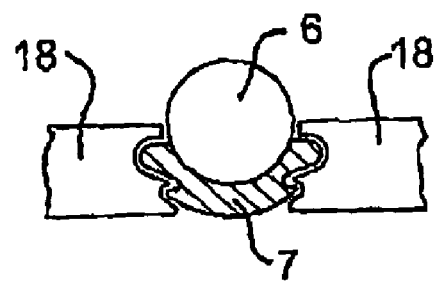
Figure 14:
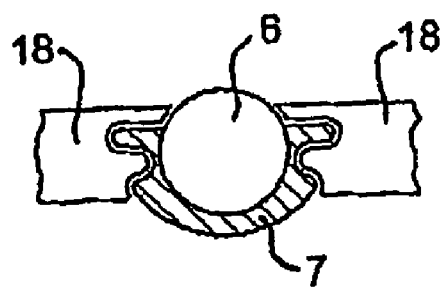

FIGS. 12 and 13 show snap-fit or slide-in type attachment elements, which use rib and groove type connections. FIG. 14 is similar to FIG. 13, except that more of the main body portion 6 is masked. Thus, the attachment elements 7 may mask more or less of the main light guide body 6 depending on the emissive surface required.

The attachment elements 7 may allow the main light guide body 6 to retain a substantially cylindrical or other preferred shape, e.g. for optimal light transmission and emission, whilst the attachment elements 7 may be shaped to provide the required attachment configurations and may be opaque, reflective and/or coloured to prevent loss of light through the attachment element and/or to provide interesting lighting combinations.

Figure 15:
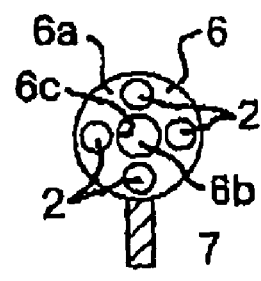

The light guide 1 or main body portion 6 may itself also be configured in a number of other forms, e.g. as shown in FIGS. 15 to 18, in which the body portions 6 of the light guides have tubular, triangular, semi-circular and rectangular profiles respectively. In FIG. 15, the light from LEDs 2 may be coupled into the annular wall 6a of the light guide body 6, rather than into the hollow core 6b, and the inner wall 6c of the guide could be masked, e.g. coated with reflective material. In FIGS. 16 to 18, a reflective element 22 may also be provided on the base face of each of the light guide bodies 6, so that all of the light is emitted from the front face or faces of the guides 1. In FIG. 17, two flange elements 7 are provided. In FIG. 18, the reflective element 22 is extended about the longitudinal side walls 23 of the guide body 6 so that light coupled into the light guide 1 is channelled out of the front face 24 of the guide 1 only. The reflective element 22 may be formed as part of the flange element 7, or as a separate element, and the reflective element 22, flange element 7 and main body portion 6 may be co-extruded together.

FIG. 19 shows a further light guide 1, which is of a semi-circular profile, and has a main body portion 6 and flanges 7. It is lit by LEDs 2 and also by an electroluminescent strip 25, which could include for example a panel or strip of a light-emitting capacitor and will include suitable wiring 25a for illumination purposes. The use of both LEDs 2 and an electroluminescent strip 25 allows for a particularly bright assembly, as well as for a number of different lighting combinations, e.g. various different colour regimes and the like. The electroluminescent strip 25 also serves to prevent light being emitted from the base of the light guide 1, and such strips could also for example be used in place of the reflective material shown in the other light guide examples discussed above.

The above-discussed light guides 1 may be used in a number of different situations, and have many advantages. They may provide decorative and interesting forms of trim and piping for many different types of articles and devices.

FIG. 20 shows a bag 26 having a pouch defining portion 27 and a handle 28, which is ornamented with illuminated trim 29 mounted on the bag pouch 27. The trim 29 is formed of a light guide 1, e.g. of a form discussed above, that has a LED 30 butt-coupled to one end, and that may for example be masked with an opaque or reflective material 31 at the other end, e.g. a silvered coating. The LED 30 is connected to a controller and battery unit 32, that may for example be mounted in the base of the pouch 27 or elsewhere, e.g. in the sidewall of the pouch. The LED 30 may be mounted in a plastic sleeve 33 that may be push-fitted onto the end of the light guide 1.

The light guide of the trim 29 may be mounted to the bag pouch 27 via flange attachment elements 34, such as discussed above. For example, the pouch material may be slit and the flanges 34 may extend behind the front surface material of the bag and be stitched or adhered in place. The use of a number of separate flange elements 34, rather than a continuous flange may allow the light guide 1 to better bend to the desired shape.

As well as the trim 29, the handle 28 may be formed as a light guide, e.g. of extruded polyurethane, polyester or other suitable polymeric material. The body of the handle light guide 28 may connect to the bag pouch 27 via a sleeve 35 at each end of the guide, only one end being shown in part section of the bag. The sleeves 35 extend through apertures in the top of the bag pouch 27 at either end of the bag. Each sleeve 35 has a flanged end 36 that sandwiches the periphery of the bag aperture with a reinforcing element, e.g. a washer 37. A cable tie 38 clamped adjacent the washer 37 holds the washer 37 against the sleeve flange 36 and also grips the sleeve 35 tightly onto the ends of the handle light guide 28. A LED 39 is mounted in the end of each sleeve 35 and connects to the controller and battery 32.

Overall, the light guides of the handle and trim may provide a visually pleasing and stylish effect, in accordance with a program implemented by the controller 32. This could e.g. be constant illumination, flashing, illumination in accordance with a preset program and/or illumination based on a parameter detected through a sensor on the controller 31, e.g. sounds.

Figure 21:
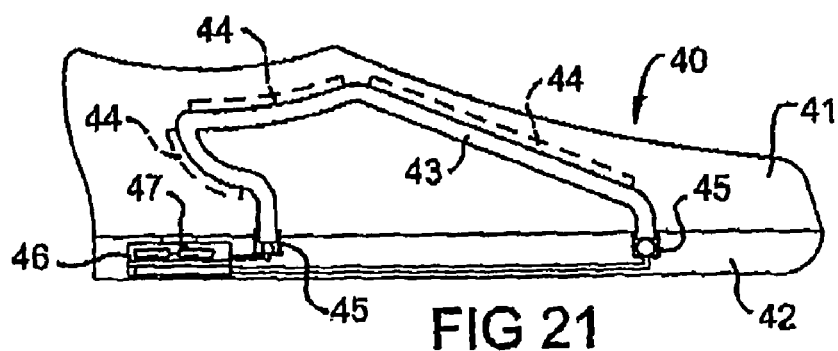
FIGS. 21 to 23 are views of footwear with light guide trim.
Figure 22:
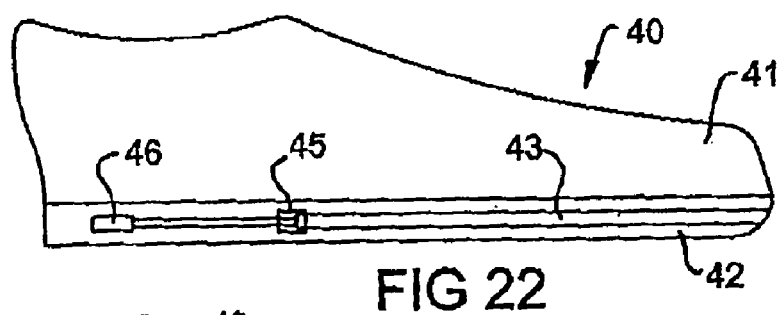
Figure 23:
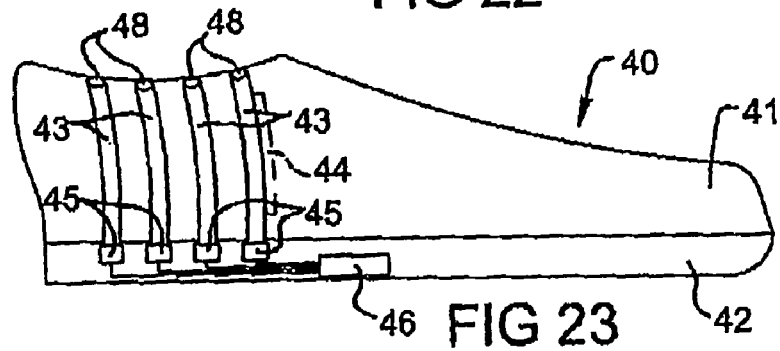

FIGS. 21 to 23 show a shoe 40 having an upper 41 and a sole 42 including a number of light guide trim patterns 43.

In FIG. 21, a light guide trim 43 is mounted in the upper 41, e.g. through an attachment element 44, e.g. of a form discussed above, such as a flange or tab. A LED unit 45 is mounted at each end of the light guide trim 43 in the sole 42, and connects to a controller 46 also mounted in the sole, e.g. in the heel. The controller 46 powers the LED units 45 and may operate them in any suitable manner. In one embodiment, the controller 46 is connected to a pressure sensor 47 that detects changes in pressure in the sole caused by the wearer's footsteps. This for example allows the light guide trim 43 to be flashed, change colour or be otherwise controlled based on the detection of the wearer's footsteps.

FIG. 22 shows a light guide trim 43 that is mounted along the sole 42 of the shoe 40, and that extends along each side and the front of the shoe. A LED unit 45 is provided at each end of the guide trim 43 and is controlled by a controller 46. In this embodiment, the light guide trim may be moulded into the sole 42, and may be recessed into it. The trim also however includes a flange element or other attachment element profile to secure it in place.

FIG. 23 shows a number of light guide trims 43 positioned vertically on the shoe upper 41 using flange attachment elements 44. In this embodiment, each guide trim 43 may have only a single LED unit 45 associated with it, and light may also exit from the opposite end 48 of the trims 43 from the LED units 45, so as to provide a further decorative effect. Alternatively, a LED could be provided at each end of the guide trims 43 or their ends may be masked, e.g. opaquely or reflectively. The controller 46 may for example control the LED units 45 so as to light each of the light guide trims 43 in turn, and the LED units 45 may each provide a different colour of light. Many other lighting regimes are also possible.

Figure 24:
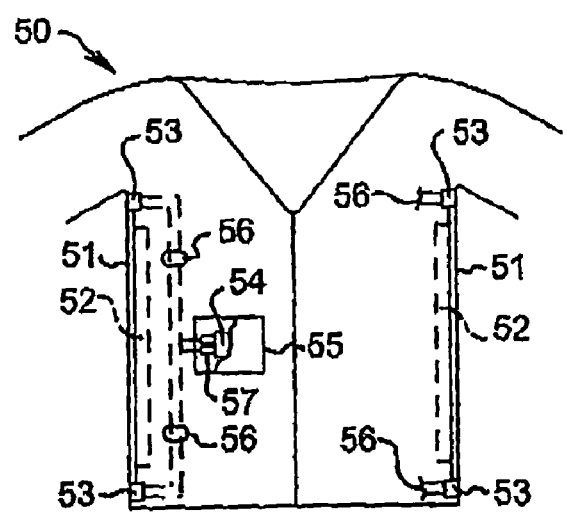
FIG. 24 shows a piece of clothing having a light guide trim and a detachable controller and power unit.

The light guides may also be used in clothing, and FIG. 24 is a view of a jacket 50 having light guide trim 51 therein that is fastened to the jacket material through stitching of flange elements 52. LED units 53 are coupled to the ends of the light guides 51 and are connected to a controller 54 in a pouch 55 by wires 56. The controller 54 is preferably removable from the jacket, and may connect with the wires through suitable plug connectors 57. This then allows the clothing to be washed without damaging the controller 54 and the batteries and circuitry therein. The light guide trim 51, LED units 53 and wires 56 can all be made suitably robust and sealed so that they may survive washing without damage.

As well as providing a decorative jacket, the illuminated trim may also provide a safety function, and may highlight the wearer to other, e.g. in the manner of reflective strips.

Indeed, the light guides may be used to provide other forms of illuminated safety clothing and articles. They may for example be used to make arm bands, shoulder straps and harnesses, illuminated strips, illuminated outerclothing, helmets and the like, that allow a cyclist, emergency personnel or the like to be seen, e.g. at night. Again, the controller may be removable, should the clothing or article need to be washed, although this may not be necessary in many cases.

Figure 25:
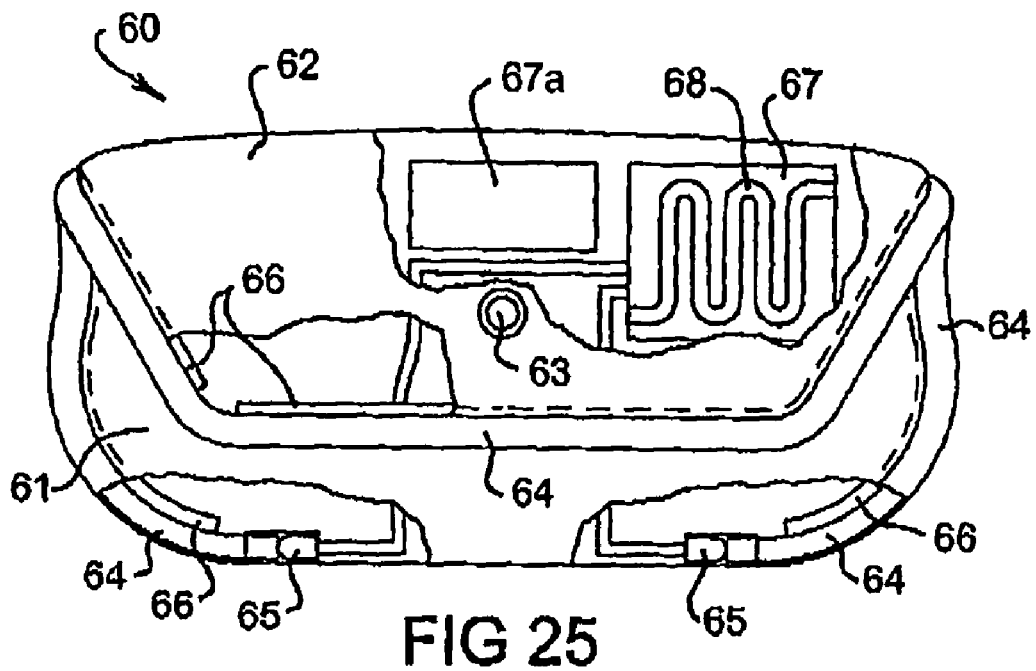
FIGS. 25 and 26 are front and rear views of a mobile phone case having illuminated trim, partially in section.
Figure 26:
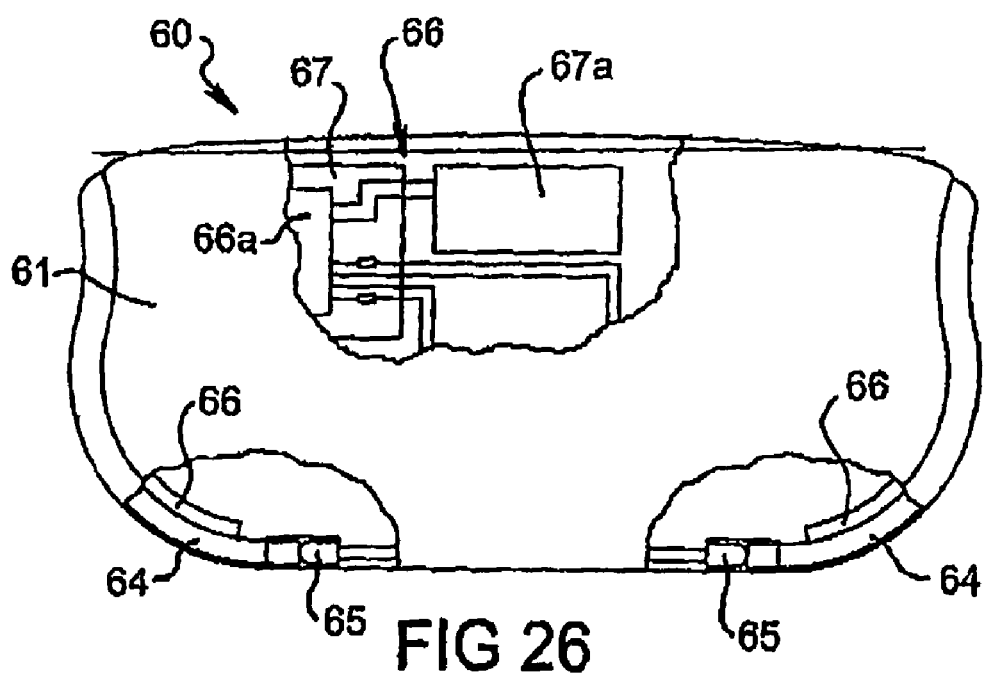

The light guides discussed above may also be used in other functional manners, and FIGS. 25 and 26 are front and rear views of a mobile phone case 60 having a pouch portion 61, a closure flap 62 and a snap fastener 63, in which light guide trim 64 not only provides a decorative effect, but may also alert a user to a phone call.

The side-emissive light guide trim 64 extends along the front edge of the flap 62, down opposite side edges of the pouch 61 and inside of the pouch 61, where it couples with LED units 65 at each of its two ends. The guide trim 64 may be mounted in place by stitching flanges 66 to the walls of the pouch 61.

The LED units 65 are controlled by controller circuitry 66, including e.g. a microprocessor controller 66a, mounted on one side of a circuit board 67 that is mounted in the rear wall of the pouch 61 along with a battery 67a, e.g. a lithium cell, such as a CR2016, e.g. between an outer pouch wall and an inner lining material.

The circuit board 67 also has a sensor coil 68, e.g. an RF coil, mounted on it, on the opposite side to the controller circuitry 66. The sensor coil 68 senses electromagnetic radiation from a mobile telephone in the pouch 61 when the mobile telephone is receiving or sending data. The controller 66a can therefore detect when a call is made to the mobile phone in the case 60, and can alert the user accordingly. For example, the trim 64 may remain unlit until a call comes in, at which point the controller 66a may light up the trim 64 to indicate the call, and may flash the trim. The trim 64 may also be constantly lit for a decorative effect, and the controller 66a may then flash the trim 64 when a call is received.

The light guide trim 64 and controller circuitry 66 could also be provided on a mobile phone itself or in any other suitable mounting arrangement. Where the light guide trim 64 is mounted on a phone, the associated LEDs may also or alternatively be controlled based on the mobile phone's software.

Figure 27:
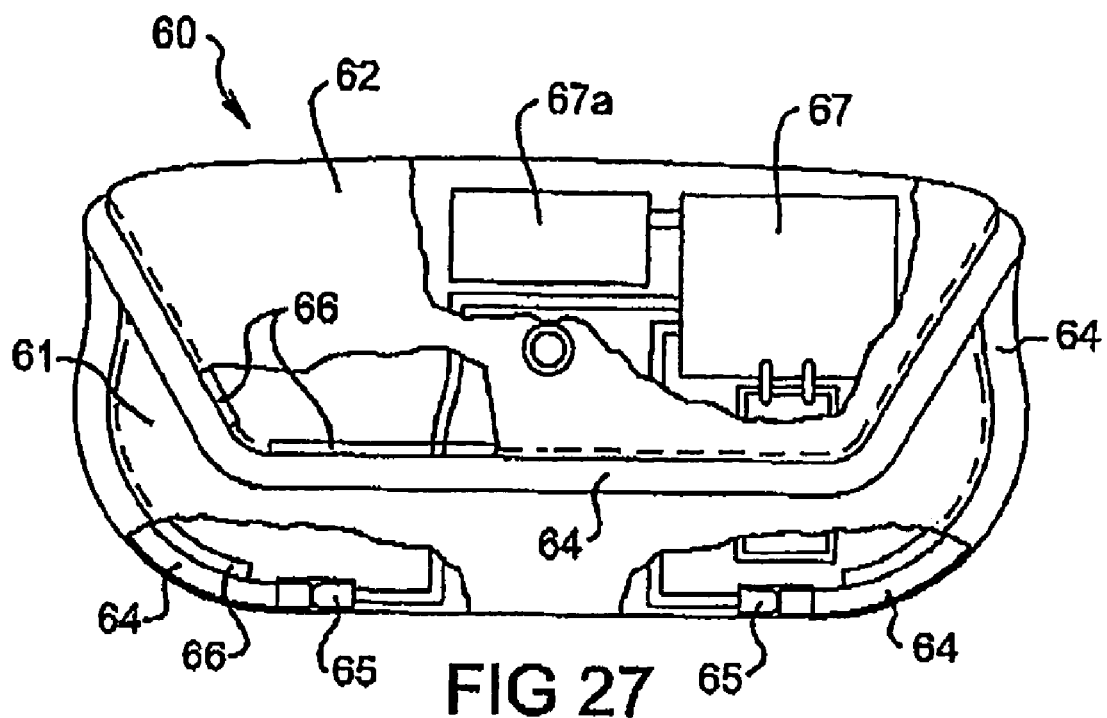
FIGS. 27 and 28 are front and rear views of a further mobile phone case having illuminated trim, partially in section.
Figure 28:
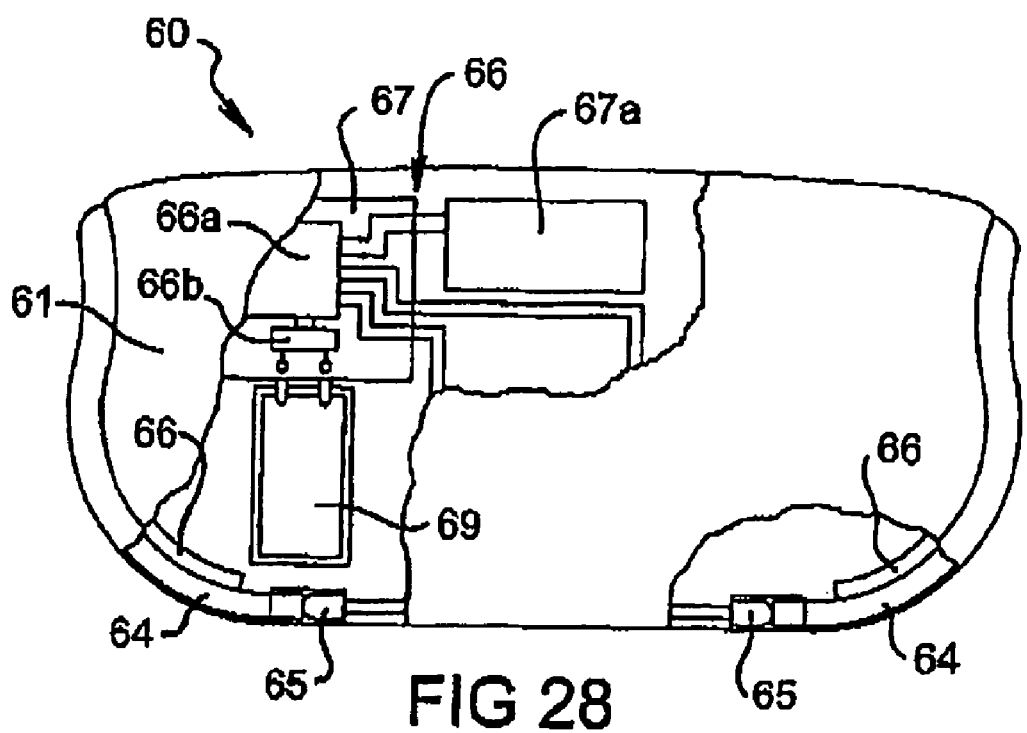

FIGS. 27 and 28 show a further embodiment of a mobile phone pouch 60, in which the RF coil 68 is replaced by a vibration sensor 69. In this embodiment, the mobile phone needs to be set to provide a vibrational response to a call, as is generally a possibility for most mobile phone units. The vibration sensor 69 will sense the vibration of the phone, and will light up the trim 64 accordingly.

The vibration sensor 69 may for example be a piezoelectric sensor, e.g. a laminated piezoelectric film, that will generate electric voltages in accordance with an applied vibration.

The sensor circuitry 66 may monitor the voltages, and may determine whether they indicate a mobile phone ring vibration. For example, the controller 66a may look for characteristic frequencies in the sensor output that correspond with mobile phone call frequencies. The controller may also check repetition rates and signal amplitudes in the monitored sensor signal, and also may compare the sensor signal with a reference signal. It may distinguish the mobile phone vibrations from other ambient vibrations, for example general bumps, noises, voices, car vibrations or the like.

The circuitry 66 may also include a filter 66b for monitoring the detected vibrations. This may allow the controller 66a to wait in a sleep mode until an appropriate signal is detected, thereby saving battery life. Once the controller 66a is woken by a signal from the filter 66b, it may further monitor signals from the sensor 69 to determine if it is indeed a mobile phone vibration that is being detected. The filter 66b may therefore conduct a rough, general determination of a mobile phone vibration, and the controller 66a may make a more accurate determination. The filter may be hardwired into the circuitry 66.

The circuitry 66 may be configured to learn a mobile phone response, and may include a switch to place it in a learning mode, wherein a user will place their phone in the pouch and cause it to vibrate. The circuitry 66 will then store characteristics of the vibration, and will use these characteristics to determine whether or not the piezoelectric sensor 69 is sensing the vibrations of the mobile phone or not.

The use of the vibration sensor 69 enables the system to detect calls to mobile telephones where the signals are too weak to be accurately detected by an RF coil. This may include for example CDMA phones and G3 phones.

As well as using the light guide trim 64, the mobile phone pouches of FIGS. 25 to 28 could also use any other type of light signal to alert a user to the call, e.g. a LED or set of LEDs, and could also provide other types of alert, besides an illumination signal, e.g. an audible signal through a loudspeaker in the pouch, e.g. in the pouch wall. The latter may provide a more audible signal than the mobile phone's ring, when the phone is within the pouch. The circuitry could also include a wireless transmitter for sending a signal to illuminate a wristband or other remote alert mechanism to the call.

As well as a pouch, the mobile phone alert system could be provided in any suitable holder, and for example could be provided in a handbag or other holder. The circuitry 66 could for example light up the trim or handle light guides of the handbag of FIG. 20. The alert system could further be used with mobile phone cradles or other mountings for cars, desks and the like, and could be used with lanyards, e.g. with a side emissive light guide extending along the lanyard to provide an attractive novelty feature when the phone rings.

A mobile phone call alert system could also include both an RF coil and a piezoelectric sensor.

Another functional use of the light guides is in safety clothing, as discussed above in relation to FIG. 24, and the light guides may also be provided on other safety clothing and safety device in general, including for example on life preservers, including personal flotation devices, life-jackets, life vests, life rings, life belts, survival suits and the like.

Figure 29:
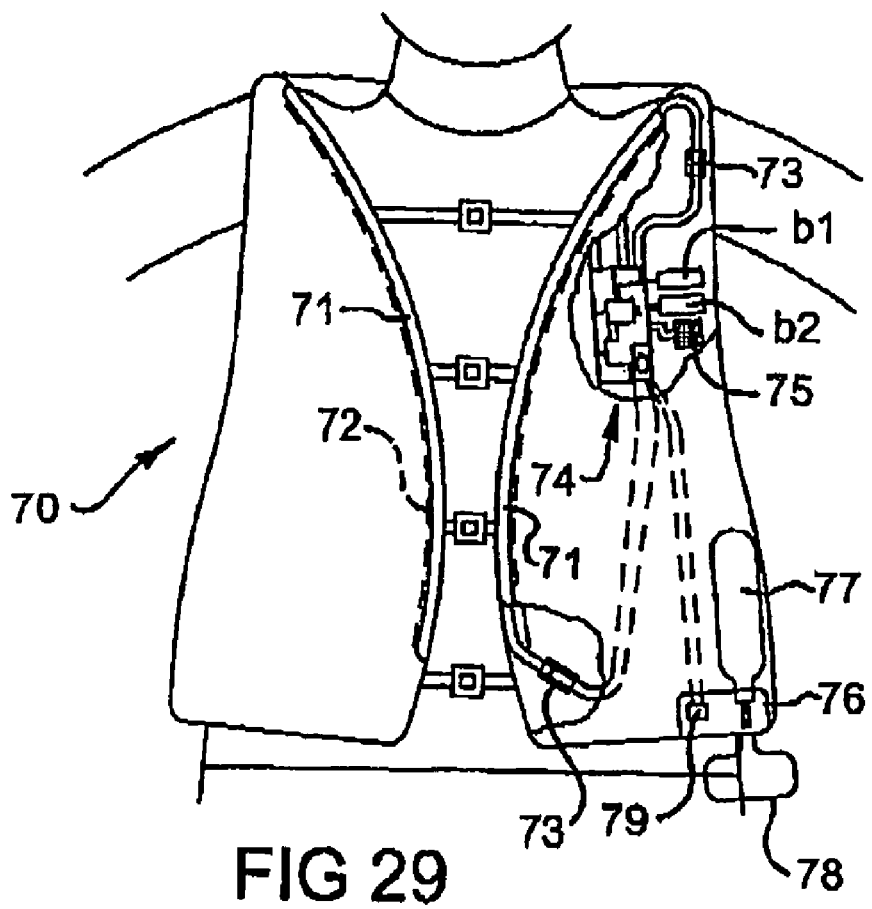
FIG. 29 shows a life vest having light guide trim that may illuminate on contact with water.

FIG. 29 shows a life-vest 70 in partial section, on which are provided light guide trims 71 having attachment flanges 72, e.g. as discussed above. A lighting unit 73, e.g. for butt-coupling a LED to the light guide trim 71, is coupled to a controller 74 and the controller 74 monitors a sensor 75 for detecting when the life-vest 70 is in the water, e.g. a fresh or salt water detector. The controller 74 may then illuminate the light guide trim 71 immediately when the vest 70 is in the water, and may flash or the like to attract attention. The sensor 75 may for example comprise a material that dissolves on contact with water to allow a connection between two parts of an actuation device, e.g. two parts of an electrical connection. Instead of or as well as the sensor 75, the controller 74 may connect to an inflation mechanism 76 of the life-vest 70. The inflation mechanism 76 may for example take the form of a $CO_2$ cartridge 77 that may be released on contact with water or through manual activation, e.g. through a pull-cord 78. In this case, the mechanism 76 may include an illumination switch 79 that is activated by the inflation mechanism, e.g. pull cord action or water sensor. The controller 74 may also allow the light guide trim to be illuminated manually, e.g. so that the user may be seen at night when walking around a boat or the like. In this case, the manual and emergency powering of the trim may be achieved by separate power sources, e.g. separate batteries b1 and b2. This ensures that the trims will always have sufficient power for an emergency situation. As well as manual actuation, the trim could also be illuminated based on a non-emergency sensor, e.g. a photocell to detect low ambient lighting conditions.

The ability to provide sealed waterproof light guide assemblies, e.g. through the use of polymeric light guides with integral attachment flanges, is particularly useful in such situations.

Figure 30:
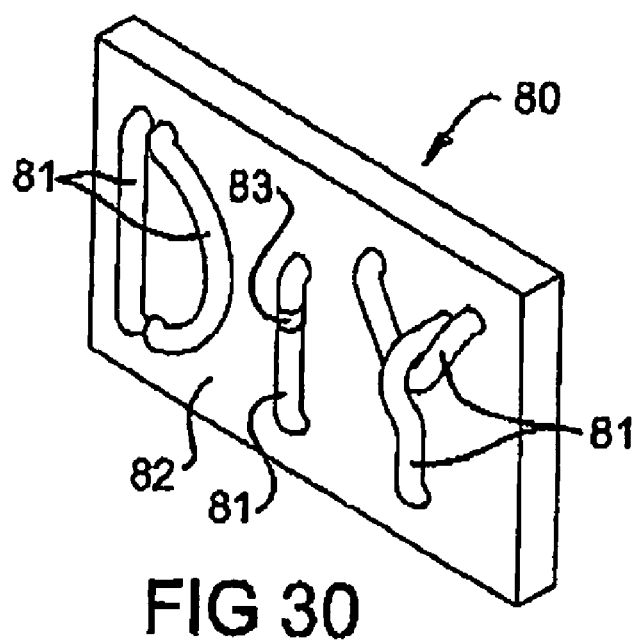
FIG. 30 is a perspective view of a sign formed from light guide elements.

A further particularly advantageous implementation of the light guides discussed above is in the provision of signage. FIG. 30 shows a sign 80 that is made up of a plurality of flexible side-emissive light guides 81 mounted on a base board 82. The light guides 81 are shaped and arranged into a desired set of graphics, and may include black-out elements 83.

When light is introduced into the light guides 81, they may glow along their length thereby providing an illuminated sign having an appearance similar to that of a neon sign. In the shown sign, the black-out element 83 blocks light along a portion of a light guide 81 that forms the letter "i", so as to define the body of the "i" and its dot.

Although able to have the appearance of a neon sign, the sign 80 is less expensive and more simple to make than neon signs, and allows for simple custom design, as well as greater control over the colours and illumination regimes of the sign. It may also have high energy efficiency.

The sign 80 may be provided as a DIY kit or may be manufactured by a signmaker.

Figure 31:
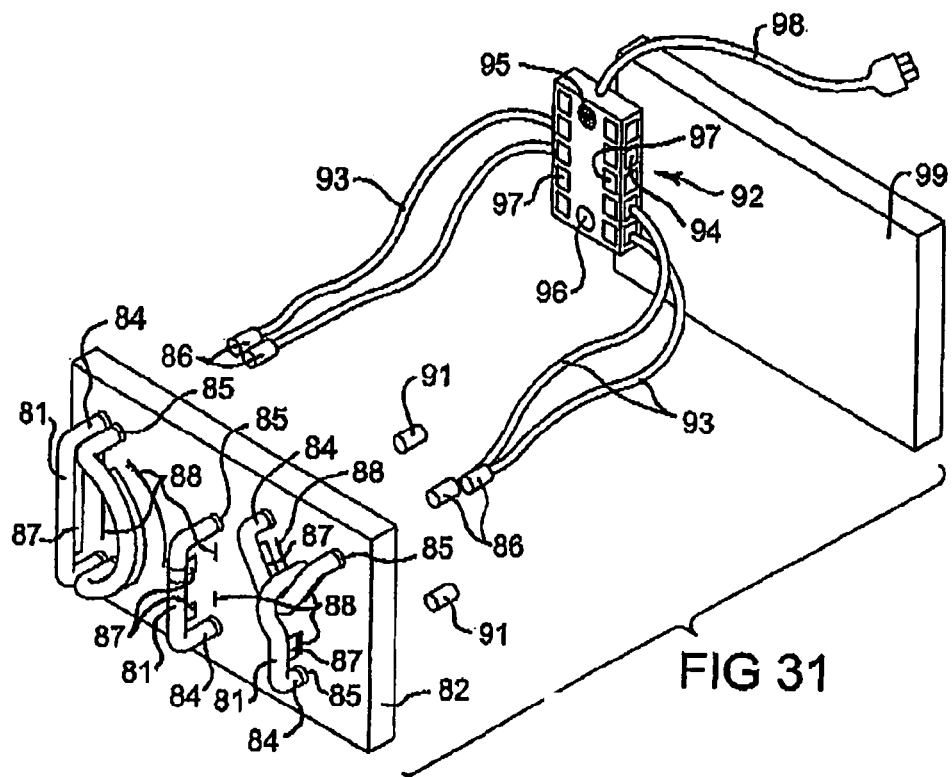
FIG. 31 is an exploded view of signage elements that may be used to form the sign of FIG. 30.
Figure 32:
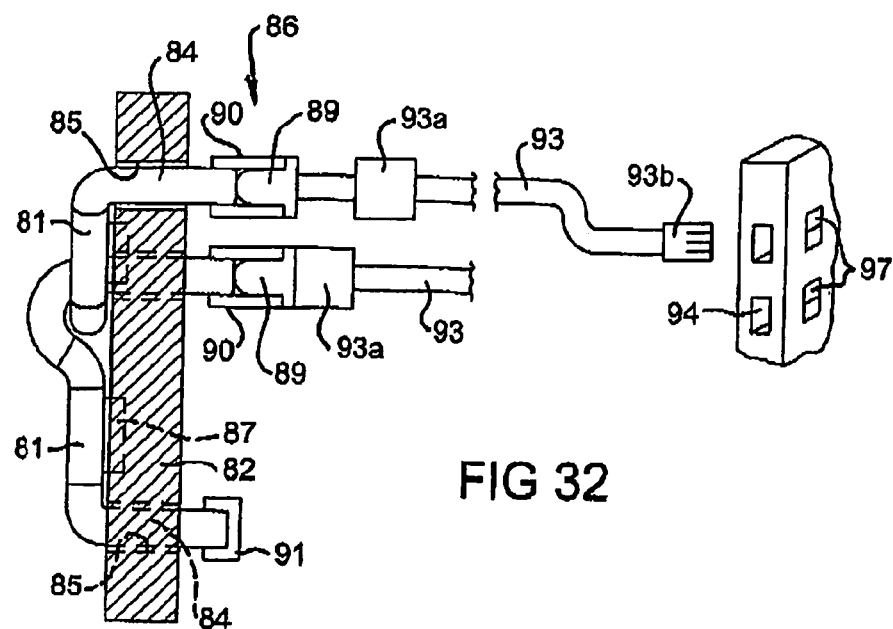
FIG. 32 is a cross-section through a portion of the sign of FIG. 31.

FIG. 31 shows an exploded view of one form of sign 80, and FIG. 32 a cross-section through the board 82. In this sign 80, the ends 84 of the light guides 81 pass through holes 85 in the board 82. This helps to hold the light guides 81 in position on the board 82, and also allows them to be connected to LED lighting units 86. Also, the light guides 81 having flanges 87 along their length that extend into slots or slits 88 in the board 82. These slots or slits 88 follow the curve of the required signage lines, e.g. lettering or pictorial graphics, and help ensure that the light guides 81 hold their position well.

Although not shown, the light guides 81 could also or alternatively be held in place by anchoring elements, e.g. u-shaped clips that pass over the guides 81 and anchor into the board 82. The presence of the flanges 86 however can remove the need for such anchors, and may provide a cleaner and easier method to form a sign.

The sign 80 may be constructed in a number of ways. In one construction, the board 82 is a rigid board, and the slots 87 are cut into the board. The flanges 87 are then placed into slots and are anchored in place in a suitable manner. This may be by a clip-fit, by adhesion, by fastening elements or in any other suitable manner. The flanges 87 may be shaped accordingly. In another construction, the board 82 is resilient, so that after slits 88 are formed in the board 82, the flanges 87 can be pushed into the slits, with the material around the slits 88 then clamping the flanges 87 and holding them firmly in place. In this case, the flanges 87 need not pass through the board 82 to the other side, and may be simple flat strips of material, although they could also be profiled to provide a further anchoring effect.

The lighting units 86 may be formed from light emitting diodes (LEDs) 89 that may be end-coupled to the light guide ends 84 using flexible sleeves 90 that push-fit over the light guides ends 84 and over the LEDs 89. The sleeves 90 allow the LEDs 89 to be replaced and swapped, e.g. for LEDs of other colours, as desired, and allow for a simple connection with the ends of the light guides 81.

A light guide 81 may have a lighting unit 86 at both ends. These may be of the same colour e.g. to increase the intensity of light emitted from the guide, or may be of different colours to increase the number of possible illuminating effects. For example, LEDs could be switched on alternately to change the light guide colour, or could be switched on together to provide a mix of colours along the length of the light guide 81.

The light guides 81 may alternatively have a lighting unit 86 at only one end. In this case, the other end of the guide may be capped to prevent loss of light from the end. This may be achieved by end caps 91 that may be push-fitted over the ends 84 of the guides 81. The caps 91 may be silvered to efficiently reflect the light back down the guide 81. In an alternative embodiment, the ends of the guides may be suitably finished to reflect light, e.g. may be painted with silver paint or the like.

The LEDs 89 connect to a light controller 92 via a set of leads 93 that have lead connectors 93a at one end for removably connecting to the LEDs 89 and lead connectors 93b at the other end for removably connecting with output ports 94 of the controller 92.

The controller 92 may have a bank of output ports 94 with which the LEDs 89 may be connected. These output ports 94 may be controlled to illuminate the connected LEDs 89 in accordance with any one of a number of preset lighting regimes. For example, the LEDs may be run constantly or flashed in some manner, e.g. to create sequences, animations, patterns or loops, or may be otherwise illuminated.

The same lighting regime may be chosen for all of the output ports 94, or for groups of the output ports, or each output port may provide an independent control that may or may not be synchronised with the other output ports. Two output ports may for example need to be flashed together when two light guides are used to form the same letter, whilst another output port may need to flash after the first two so that the next symbol in the sign is flashed after the first.

As well as predetermined sequences of illumination, the controller 92 may be connected to a sensor 95 whose signals may be used to determine the port outputs. For example, the sensor 95 may detect ambient sounds, temperature, pressure or light, and the controller 92 may operate the LEDs 89 in accordance with the output, e.g. to flash in response to certain sound frequencies or illuminate after the light has reached a threshold low level.

The controller 92 and/or sensor 95 may also include user controls that a user may set to modify the preset regimes, e.g. to change flash durations or frequency or to change a sensor response sensitivity or frequency.

The controller 92 may include an overall control button 96 that may be pressed repeatedly to place the controller 92 in a number of different modes, whilst each of the output ports 94 may also include individual controls 97, e.g. multi-position switches, that control each of the output ports 94 individually.

The controller 92 may also include a control line 98, e.g. a USB line, so as to program the controller 92 or to receive control inputs. The controller 92 may include flash memory that may be updated with appropriate program downloads, e.g. from a USB device or the like. The controller 92 may for example be programmed via a computer, e.g. through a USB port or the like.

A backing board 99 may be used to cover the rear of the sign 80, and the controller 92 may be mains or battery powered, e.g. with rechargeable batteries or a battery pack, or may be powered in some other way, e.g. by solar power.

The controller 92 is especially useful in DIY kits, as it provides the user with a number of possible lighting regimes and connection possibilities. The controller may however be replaced by any suitable control unit, and may simply provide power to light all of the LEDs 89 constantly or to provide a predetermined lighting regime. It may also be configured merely to light the LEDs 89 in accordance with a remote input signal on a command line, e.g. line 98. It may be reprogrammable remotely, e.g. using a personal computer or the like.

FIG. 33 shows a rear view of part of one possible system for providing signage such as in FIG. 30, which is especially useful for DIY applications. The system mounts the light guides 81 on a board 82 made of a resilient material. This material may be for example a resilient foam material, and could be e.g. EVA foam.

In use, the required graphics are marked out on the face of the board 82, and then slits 88 are cut into the board 82 along the marked-out lengths, and holes 85 are cored out at the ends of the marked-out lengths. Preferably, the slits 88 do not penetrate the rear of the board 82, although the holes 85 do. The slits 88 and the holes 85 can be formed using any suitable tools. The slits 88 may for example be cut out using a scalpel, and the scalpel may have a blade length or guide element specifically set so that the slit 88 does not cut fully through the board 82. The holes 85 may be cored out using a special corer tool 100 having a handle 101 and a corer blade/punch 102 that can extend fully through the board 82.

The light guides 81 are then cut to length, e.g. from a single length of guide, accordingly to the required graphical segments, and the flange portions 87 are removed at the ends 84 of the guides 81 and at any required points along the lengths of the guides, e.g. with a scalpel or scissors. For example, the removal of the flange portions from the light guide ends 84 allow the ends 84 to pass through the holes 85 and connect with lighting units and the like, whilst the removal of flange portions from along the length of a light guide allows the light guide to be bent more easily to a curved shape. The board 82 is flexed to open up the slits 88, and the light guide flanges 87 are pushed into the slits 88. The light guide ends 84 are then pushed through the holes 85 to allow them to be connected to appropriate lighting units 86. Once the light guides 81 are all inserted into place, the flange portions 87 will be held by the resilient material, and so the light guides 81 will be held in the correct position fully along their lengths. One or more rigid elements 103, e.g. metal or plastic battens, e.g. aluminium battens, may be attached to the rear of the board 82, e.g. using contact adhesive or double-sided tape. The rigid elements 103 may provide the board with support and may also help to flatten the board 82 and so to urge the slits 87 closed, so that they more positively clamp the flanges 87 in place.

The sign 80 of FIG. 33 may be provided in kit form. For example, it may be provided as a length of light guide, e.g. 5 meters of 5 mm light guide; a controller 92, e.g. having 20 port (two banks of 10); a mains power supply or batteries; a set of high intensity LEDs, e.g. of varying colours, e.g. red, blue, green, yellow and white; a set of LED/guide coupling sleeves; LED connector leads; a scalpel and corer tool; a length of black-out sleeve that may be cut to length to form the black-out elements 83; a mounting board 82; a backing cover 99; hanging eyelets and wire; and an instruction manual. Stencils for popular graphics, including letters, numbers, signs and the like, may also be provided, and materials may be added, omitted or varied as required.

FIGS. 34 to 36 show a further sign construction, which may for example be suitable for use by a sign manufacturer to provide standard or bespoke signage. In this embodiment, the board 82 is of a rigid form, e.g. a plastic or metal board, e.g. an aluminium or steel board. The slots 88 and holes 85 may be machined into the board 82, e.g. through laser cutting or other computer controlled cutting instruments, and the sign may be designed on a computer using CAD or similar software. As before, the light guides 81 may be cut to length, and the flange elements 87 removed at the ends of the guides 81, to allow them to be pushed through the holes 85. The flange elements 87 of light guides 81 may then be placed into the slots 88, and the light guide ends may be placed in the holes 85. The flange elements 87 may then be anchored into place, e.g. through a snap-fit action. Thus, the flange element 87 in the light guide 81 of FIGS. 33 and 34 has a cross-section that allows it to snap-fit into the slots 88.

The flange elements 87 could also take any other suitable form and could be fixed in place in any other suitable manner, e.g. by anchoring elements, by adhesive or by welding. For example, a flange element formed of a flat elongate strip may be folded over and adhered to the inner surface of the board 82 along the periphery of the slots 88.

The sign 80 may be free-standing, and e.g. may be fixed to a vertical stand or pillar or may be rested on a surface with the backing board including a stabilizing prop that extends out the back. It may alternatively be fixed to a wall, door or the like. It may be hung, e.g. by standard picture hanging wire and self-tapping hanging eyelets.

A number of signs 80 may be connected together to form a larger composite sign, and the controllers 92 may be linked to synchronise themselves or may include timers to allow for such synchronisation, or may all be centrally controlled, e.g. by a remote computer via e.g. a USB line.

Figure 37:
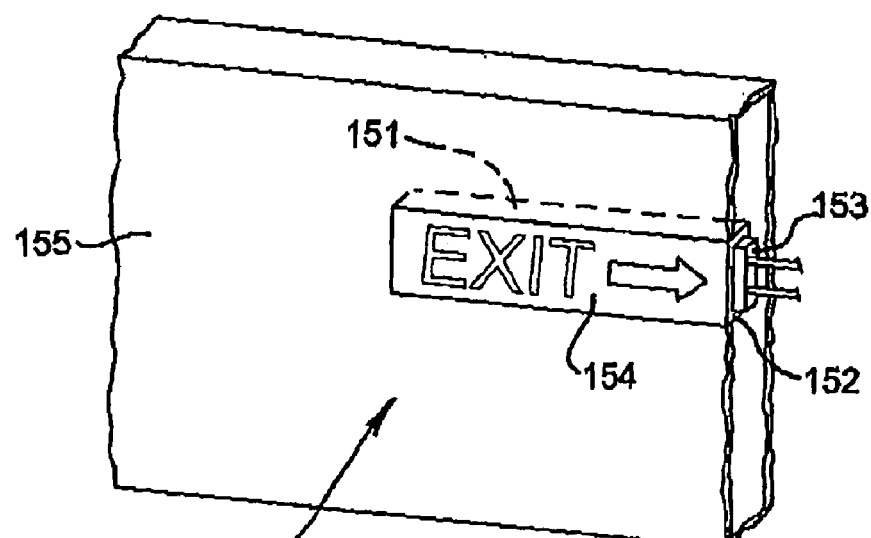
FIGS. 37 to 41 show further signage elements that use side-emissive light guides with graphics printed on a front face thereof.

Another form of signage is shown in FIG. 37, in which a sign 150 may be formed from an elongate solid block 151 of side-emissive polymeric material that is lit at an end 152 by an array of LEDs 153 and that emits light out of a front face 154 on which are printed graphics. In this case the block 151 may be of a rigid form, although it could also be of a flexible form.

The front face 154 is provided with suitable graphics, whilst the other edges and the rear face of the block may be masked with opaque or reflective material so as to direct the light out of the front face 154 of the block only, and/or may include electroluminescent strips or panels to light the sign.

The graphics may be provided in a positive or negative manner, i.e. the front face may be printed to so that the background is lit and the graphics are solid, or the front face may be printed to so that the background is solid and the graphics are defined by the regions of the front face on which there is no printing, so that the graphics themselves light. The graphics may be translucent, so that the signage colours are a mix of the graphics colours and the light emitted from the side-emissive material.

The sign 150 may be mounted normally on to a wall 155, but in one preferred construction, the sign 150 is recessed into the wall 155, and the front face 154 of the block 151 is masked with removable masking elements that e.g. are releasably adhered to the block. The whole front face 154 of the block 151 may be painted over, together with the rest of the wall 155, and the masking may then be removed to reveal unpainted regions of the front face 154 through which light can pass. Through this procedure, lit graphics may appear from out of the wall. The front face 154 of the block 151 is preferably flush with the face of the wall 155, although it could also be proud of the wall surface or recessed into it.

The removable masking material may for example take the form of removable adhesive plastics film, e.g. a removable sticker, wax paper and the like.

Figure 38:
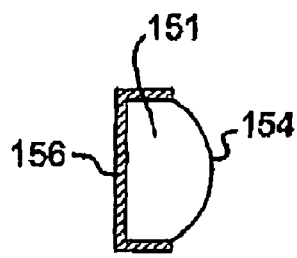
Figure 39:
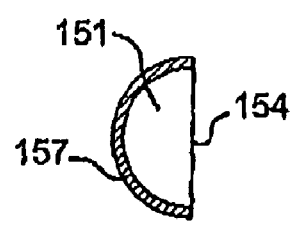

The block 151 may have various different profiles, e.g. as shown in FIGS. 38 and 39. In FIG. 38, a front face 154 of the polyurethane block 151 is curved, whilst the remainder of the sides 156 are masked. In FIG. 39, the rear masked face 157 is curved, and the front face 154 is flat. The curvature of the front surface 154 or rear reflective surface 157 causes light to exit from the front faces 154 at a number of different angles, and so provides the signage with a bright appearance. For example, the surfaces may be formed into parabolic curves.

Figure 40:
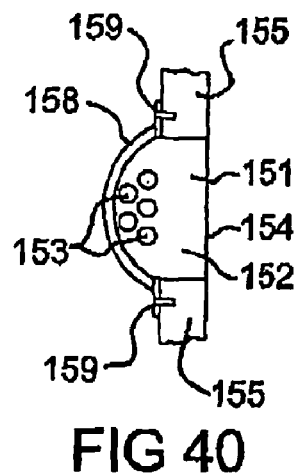
Figure 41:
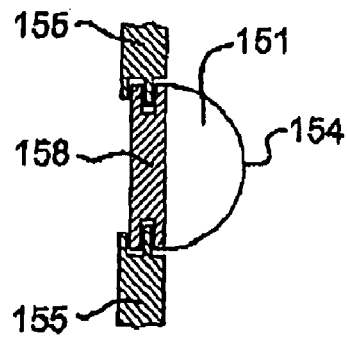

FIGS. 40 and 41 show further profiles for the block 151 and also the use of attachment elements 158 that may be configured for mounting the light guide blocks 151 onto a wall 155. These attachment elements 158 may be integral with the light guide block 151 and have any of the forms discussed above and may be opaque or reflective and may provide a masking function also.

In FIG. 40, the attachment element 158 has a pair of flange portions 159 along the top and bottom edges of the signage, which may be opaque to prevent light leakage through them, and which may allow the signage to be fastened to the wall 155, e.g. through screws or the like. The attachment element 158 also has a rear reflective portion for masking the rear of the block 151 and for reflecting light out through the front face 154.

The block 151 is preferably made from polyurethane, although other materials may also be used so long as they provide suitable light transmission and side-emission characteristics. Also, although shown used with an array of LEDs, other light sources such as incandescent lights and halogen lamps could be used. The block 151 could also be illuminated by electroluminescent material, e.g. as shown in FIG. 19. Thus, EL material could be provided along the rear surface of the light guide block. The EL material may preferably be used with LEDs that couple light into the ends of the signage element.

In the various embodiments discussed above, light guides are disclosed that may be used for decorative trim, for providing alerts, for providing safety illumination and for providing signage. The light guides may also be used to provide general illumination, e.g. to illuminate a surface or a surrounding area.

The various light guides are advantageously formed of polyurethane, polyvinylchloride and polyester materials, and may be solid or in tubular form. They may include cladding or be unclad. Indeed, it has been found that a simple solid unclad length of polyurethane can provide a very effect light guide over the short distances involved in providing trim, piping and the like, e.g. for articles such as clothing, footwear, bags, or for electronic devices or the like, e.g. over distances of less than about 2 m, 1.5 m, 1 m and often less than about 50 or 30 cm. Longer lengths of guide may also however be usefully made.

The polyurethane material may be based on any suitable isocyanate, e.g. diisocyanate, and polyol combination. The polyol may for example be a polyester, polycapralactone, or polycarbonate. It has been found that the use of a polyether polyurethane is especially advantageous and can provide a side-emissive light guide having both a bright output and good transmissive qualities. The material may also include any suitable additives, including for example additives for ultraviolet protection.

Thus, a preferred light guide is formed from an unclad solid length of extruded thermoplastic polyurethane material of polyether composition with UV protection additives.

Although discussed above mainly in respect of the type of light guide used, the various articles and signage are also in themselves novel, irrespective of the illumination elements chosen. For example, the signage light guides could take any form that allows them to be bent and mounted.

It is to be understood that various alterations, additions and/or modifications may be made to the parts previously described without departing from the ambit of the present invention, and that, in the light of the above teachings, the present invention may be implemented in a variety of manners as would be understood by a person skilled in the art.

The invention claimed is:

1. A sign comprising alpha-numeric characters and/or graphical elements which are formed by one or more flexible side-emissive light guides wherein at least one character or element of the sign includes a portion of the light guide overlapping another portion of the light guide, each said light guide comprising a longitudinal body with at least one transverse end face and an integral anchoring element present along its length wherein at least a portion of the anchoring element is removed to permit the overlap, a board for mounting said light guides, and one or more lighting elements for lighting said guide or guides, wherein at least one lighting element is coupled to at least one transverse end face of each light guide and the light from said at least one lighting element being transmitted along the body of said light guide and emitted from the side of said light guide.

2. The sign of claim 1, wherein said board is formed of a resilient material into which slits are cut, and wherein said resilient material clamps anchoring elements inserted into said slits.

3. The sign of claim 2, including a rigid element for reinforcing said board and for urging said slits to close.

4. The sign of claim 1, wherein said anchoring element is a flat elongate strip of material.

5. The sign of claim 1, wherein said anchoring element comprises a reflective material.

6. The sign of claim 1, wherein a lighting element is coupled to a transverse end face of said light guide in a push-fit manner.

7. A method of making an illuminated sign of alpha-numeric character and/or graphical elements including the steps of:
   cutting a length of side-emissive light guide into a number of light guide portions in accordance with a desired design of alpha-numeric character and/or graphical elements, said length of light guide having an integral reflective anchoring element extending along its length;
   cutting slits or slots and exit holes in a mounting board in accordance with said desired design;
   mounting said cut light guide portions onto said board, with anchoring elements of said cut light guide portions held in said slits or slots and with the ends of said cut light guide portions extending through said exit holes; and
   coupling at least one light source to at least one transverse end face of each mounted light guide portion.

8. The method of claim 7, wherein said board is formed of a resilient material, and including the steps of:
   cutting slits in said board, flexing said board to open said slits and mounting said anchoring elements of said cut light guide portions in said slits; and
   closing said slits such that said board grips said anchoring elements.

9. The method of claim 7, wherein a portion of the anchoring element is removed to permit the overlapping of the light guide.

* * * * *